US011665178B2

(12) United States Patent
Gutierrez et al.

(10) Patent No.: US 11,665,178 B2
(45) Date of Patent: May 30, 2023

(54) METHODS AND ARRANGEMENTS FOR MESSAGE TIME SERIES INTRUSION DETECTION FOR IN-VEHICLE NETWORK SECURITY

(71) Applicant: Intel Corporation, Santa Clara, CA (US)

(72) Inventors: Christopher N. Gutierrez, Hillsboro, OR (US); Shabbir Ahmed, Beaverton, OR (US); Marcio Juliato, Portland, OR (US); Manoj Sastry, Portland, OR (US); Liuyang L. Yang, Portland, OR (US); Xiruo Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 643 days.

(21) Appl. No.: 16/727,638

(22) Filed: Dec. 26, 2019

(65) Prior Publication Data

US 2020/0145433 A1    May 7, 2020

(51) Int. Cl.
*H04L 29/06* (2006.01)
*H04L 9/40* (2022.01)
*H04L 12/40* (2006.01)
*G06N 20/20* (2019.01)

(52) U.S. Cl.
CPC ......... *H04L 63/1408* (2013.01); *G06N 20/20* (2019.01); *H04L 12/40032* (2013.01); *H04L 63/0227* (2013.01); *H04L 63/1425* (2013.01); *H04L 63/1441* (2013.01); *H04L 2012/40273* (2013.01)

(58) Field of Classification Search
CPC ........... H04L 63/1408; H04L 12/40032; H04L 63/0227; H04L 63/1425; H04L 63/1441; H04L 2012/40273; H04L 12/40169; G06N 20/20; G06N 3/08; G06N 5/003; G06N 7/00
See application file for complete search history.

(56) References Cited

U.S. PATENT DOCUMENTS

| | | | | |
|---|---|---|---|---|
| 10,867,042 | B2 * | 12/2020 | Chistyakov | ............ G06N 5/003 |
| 11,110,895 | B2 * | 9/2021 | Maluf | .................... B60R 25/104 |
| 2016/0036558 | A1 * | 2/2016 | Ibrahim | ................ H04W 4/027 |
| | | | | 455/297 |
| 2018/0045832 | A1 * | 2/2018 | Ibrahim | .................. G08G 1/08 |
| 2018/0150086 | A1 * | 5/2018 | Nobukawa | ............ G01S 5/0263 |
| 2018/0257660 | A1 * | 9/2018 | Ibrahim | ............ B60W 50/0097 |

(Continued)

*Primary Examiner* — Mahfuzur Rahman
(74) *Attorney, Agent, or Firm* — KDW Firm PLLC

(57) ABSTRACT

Logic may reduce the latency and increase the confidence in message time series (MTS) intrusion detection systems (IDSs). Logic may capture traffic on an in-vehicle network bus during a first traffic window. Logic may filter the traffic within the first traffic window to determine more than one observation window, wherein the more than observation window comprises at least a first observation window and a second observation window. Logic may evaluate the more than one observation window to determine a first output based on a first observation window and a second output based on a second observation window, the first and second outputs to indicate if an intrusion is detected. Logic may determine, based on a combination of the outputs, that the traffic during the first traffic window comprises an intrusion. Logic may output an indication of the intrusion.

25 Claims, 15 Drawing Sheets

(56) References Cited

U.S. PATENT DOCUMENTS

2018/0350239 A1\* 12/2018 Hourdos ............... G08G 1/0133
2019/0308589 A1\* 10/2019 Maluf ................. H04L 12/2803
2021/0182993 A1\* 6/2021 Arian ..................... G06Q 50/26

\* cited by examiner

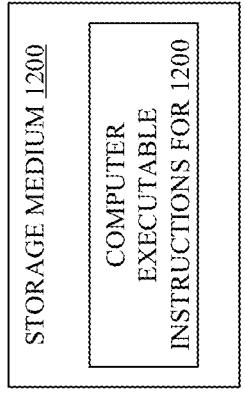
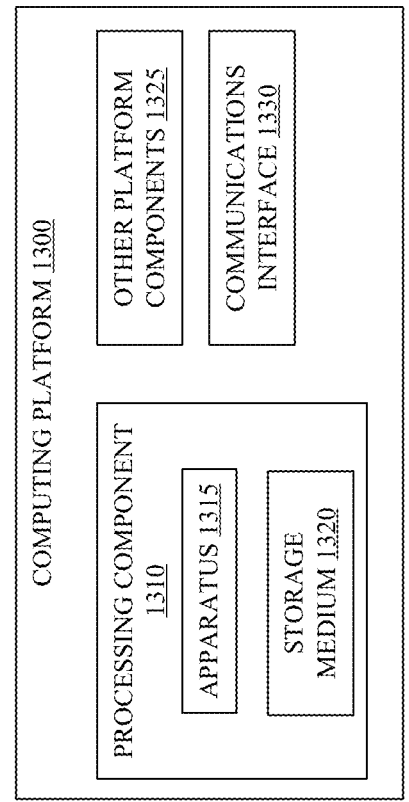

METHODS AND ARRANGEMENTS FOR MESSAGE TIME SERIES INTRUSION DETECTION FOR IN-VEHICLE NETWORK SECURITY

TECHNICAL FIELD

Embodiments are in the field of in-vehicle network security systems. More particularly, embodiments may implement message time series intrusion detection.

BACKGROUND

Automotive systems have become increasingly computerized in recent years. Driving systems rely on correct and robust operation of underlying controls. Many modern vehicles include numerous different electronic control units (ECUs), including some ECUs that are very important for safety. For instance, the ECUs in an autonomous or semi-autonomous vehicle may include an engine control module (ECM), a transmission control module (TCM), a steering control module (SCM), a brake control module (BCM), a global positioning system (GPS) module (GPSM), a vision control module (VCM), a heading control module (HCM), an in-vehicle infotainment unit (IVIU), etc. The ECUs in a vehicle may be referred to collectively as a vehicle control system (VCS).

An ECU may include a processor and software that executes on the processor to cause that ECU to perform the desired operations or vehicle functions. Such a processor may be referred to as a microcontroller unit (MCU), and such software may be referred to as firmware.

An anomaly in the operation of an ECU, whether due to adversarial actions, malicious attacks, etc., or due to one or more failures in hardware, in software, etc., can affect critical control systems of the vehicle. If an attacker can load malicious software ("malware") into an ECU, that malware may cause the ECU to perform malicious operations which can compromise vehicle safety and be very dangerous. For example, an attacker that has compromised lateral/longitudinal control of an ECU can accelerate, brake, and steer the vehicle.

Some automotive systems include a variety of ECUs with mechanical fallback for increased reliability. In some levels of automation, however, there are no physical interfaces exposed to the driver/operator. As such, during an attack on an ECU, the driver/operator is unable to take any corrective actions. Furthermore, as automotive systems evolve from driver-assisted to fully Automated Driving Systems (ADS), previously open-loop systems controlled by the driver will become closed under governance of additional distributed controllers (e.g., longitudinal and lateral control, emergency braking, etc.). Hence, securing closed-loop control systems will become critical for ensuring safety and security.

Whether closed loop or open loop, current intrusion detectors are designed to address specific attacks. An intrusion detector may monitor for a known voltage pattern and/or known threshold behavior related to the operation of an ECU. If the ECU operates outside of the known voltage or threshold, the intrusion detectors may output an indication of the anomalous behavior even though the behavior might be temporary and relate to, e.g., an anomalous external factor.

BRIEF DESCRIPTION OF THE DRAWINGS

FIGS. 12-13 depict embodiments of a storage medium to store code to detect intrusions and sporadic messages based on the intrusions.

DETAILED DESCRIPTION OF EMBODIMENTS

Figure 1:
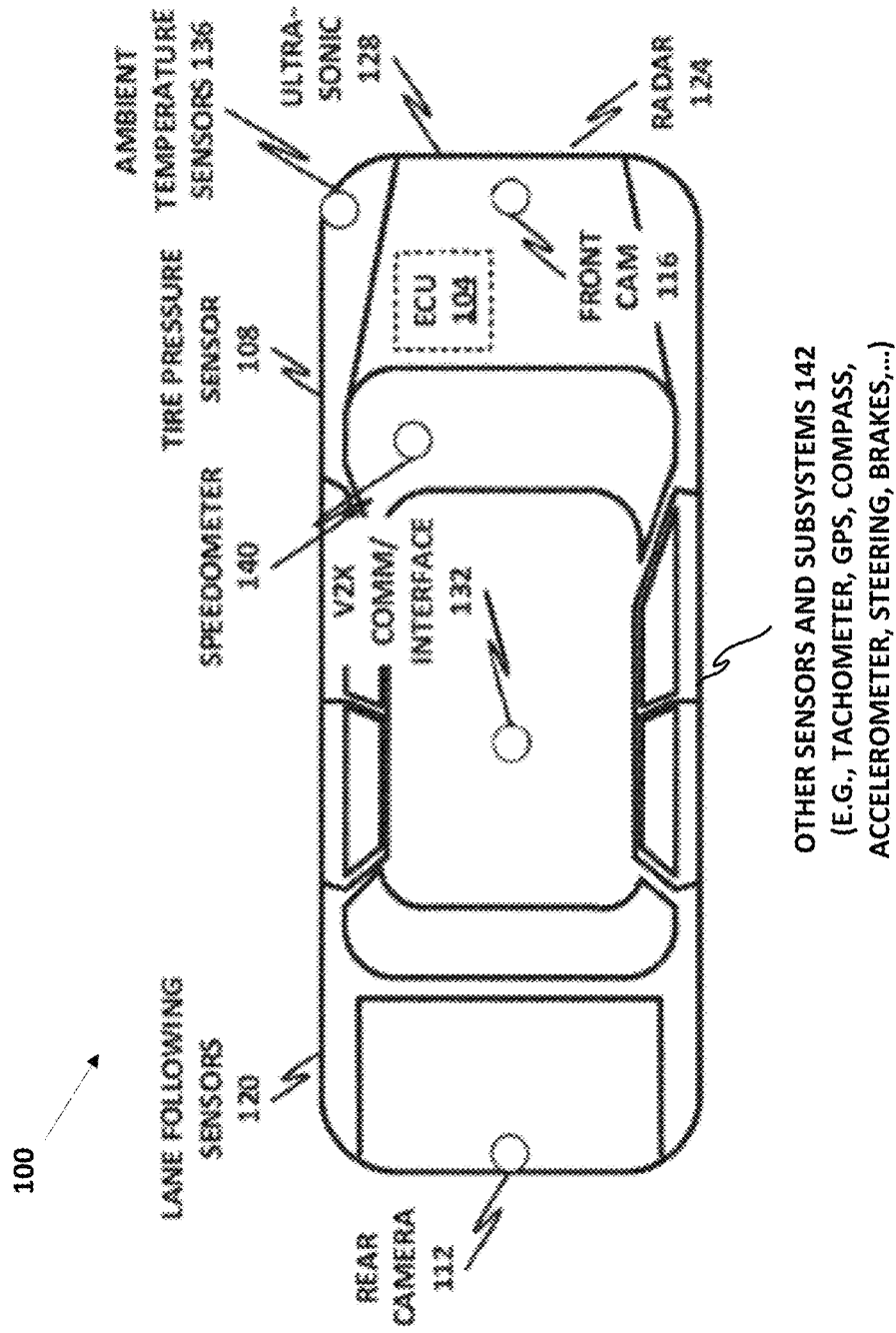
FIG. 1 depicts an embodiment of a block diagram of a motor vehicle that may host an in-vehicle network (IVN)

The following is a detailed description of embodiments depicted in the drawings. The detailed description covers all modifications, equivalents, and alternatives falling within the appended claims.

Fault-tolerant and control techniques are based on known fault-models. Such models, however, do not cover adversary models where malicious actions are unpredictable. For vehicles to remain safe for operation, the vehicles must maintain the safe operation of control systems under adversarial influences, which requires the introduction of security mechanisms to detect attacks in real time.

Many embodiments employ a message time series (MTS) intrusion detection system (IDS). Some embodiments include an MTS IDS created based on the use of expert knowledge and other embodiments include an MTS IDS created based on pattern recognition without the use of expert knowledge. Further embodiments include an MTS IDS created based on both pattern recognition and at least partial use of expert knowledge.

An MTS IDS may monitor an in-vehicle network (IVN) bus such as a controller area network (CAN) bus to detect anomalies such as messages inserted by an attacker. The attacker may be malicious code executed on an electronic control unit (ECU) attached to the in-vehicle network bus. The attacker may also transmit bad data or messages through external communications such as vehicle-to-vehicle (V2V), vehicle-to-infrastructure (V2I), vehicle-to-everything (V2X), and/or the like.

The goal of IDSs such as an MTS IDS is to minimize the latency involved with detection of an intrusion and maximize confidence in the detection of an intrusion by the IDS. Furthermore, current IDSs are designed and configured to detect a specific type of an attack so another goal for some embodiments is to broaden the utility of the IDS to detect multiple different types of attacks with a relatively low latency and high confidence.

IDSs may compare predicted bit patterns or messages to observed bit patterns or messages or the metadata of messages to determine the difference (deviation) as a function of time and the difference is typically compared against a static threshold chosen to balance the latency of detection against the confidence or reliability of detection of an intrusion. The static nature of the threshold opens the opportunity for an attacker to adjust parameters of an attack to avoid detection via the static threshold.

Many embodiments address issues related to a static detection threshold by feature extraction to generate multiple, filtered perspectives (views) of overlapping windows of time (referred to hereinafter as observation windows) of the message content, message metadata, or bit pattern on the in-vehicle network bus and analyzing each observation window to detect anomalous behavior. Some embodiments may analyze each observation window through the use of a threshold and, in some of these embodiments, the thresholds for one or more of the observation windows may be dynamic thresholds.

Other embodiments may implement a machine learning model and the various observation windows to detect inconsistencies in benign message pattern in traffic on an in-vehicle network bus. The various observation windows may cover gradual to rapid disruptions to benign patterns of the traffic. In other words, the in-vehicle network bus may form static message patterns under various time observation windows. By identifying optimal observation windows and extracting patterns in observation windows, observation of both gradual to rapid disruptions may indicate the presence of an attacker.

Some embodiments may use a machine learning model such as an ensemble classifier. On example of such a model is the random forest model. The random forest model is an ensemble learning model for classification, regression and other tasks that operates by constructing a multitude of decision trees at training time and outputting the class that is the mode of the classes (classification) or mean prediction (regression) of the individual trees. In other words, a number of decision trees are constructed based on a set of features in the messages, metadata, or bit patterns (referred to herein as feature vectors) and each tree is trained to classify an input comprising a feature vector from a different observation window of the traffic on the in-vehicle network bus. Each decision tree will reach a classification of the bus traffic that classifies the traffic as including an intrusion or not including an intrusion. The classification may, in some embodiments, be output as a probability of intrusion or a probability of no intrusion by combining the outputs from the decision trees. Such models may, advantageously, avoid selection of a threshold such as a static threshold by training the models to perform the classification for each observation window and combining the classifications of the models to determine a combined classification.

Some embodiments may include a feature generation logic circuitry to randomly identify different observation windows of the in-vehicle network bus for the machine learning model and then generate training and testing sets to train each decision tree based on the different observation windows of the in-vehicle network bus with supervised learning. Further embodiments identify optimal observation windows based on detection of various types of attacks in lieu of or in addition to the random identification of the different observation windows.

The feature vectors may include patterns of bits or message content on the in the traffic on the in-vehicle network bus. The observation windows may include filtered observations of a traffic window that are filtered to highlight different, selected features and/or combinations of features identified in the traffic on the in-vehicle network bus. In some embodiments, the features may include, e.g., messages and/or portions of messages transmitted on the bus by ECUs. In such embodiments, the observation windows may include, e.g., any combination of one or more different messages that have a particular content and/or portions of messages having a particular content.

After deployment in a vehicle and during operation of the vehicle, the feature generation logic circuitry may then select windows of time to sample the in-vehicle network bus and generate each of the different observation windows by filtering the message sequence to provide to the trained decision trees. The results of the decision trees may be combined by, e.g., averaging the results, majority vote (mode), determining a mean result, and/or the like. Embodiments are not limited to random forest models. Embodiments may implement any one or more type(s) of pattern recognition models to evaluate multiple different observation windows of overlapping windows of time of the traffic on the in-vehicle network bus.

Contemporary in-vehicle network buses transmit various different types of messages. Such variation in the content of messages causes a level of noise when trying to evaluate the traffic on the in-vehicle network bus for potential intrusions. The noise may, for instance, manifest as differences in the deviations in repetitive patterns of bits or message content in the traffic on the in-vehicle network bus. The result is that detection thresholds such as a static detection threshold must be raised above the level of the noise on the in-vehicle network bus to avoid or attenuate instances of false positives. Raising the detection threshold above a noise level on the in-vehicle network bus, however, reduces the granularity for detection of avenues of attacks such as attacks that may be present in the noise or just above the noise level on the in-vehicle network bus.

An example of noise in typical in-vehicle network bus traffic includes the transmission of both analog and digital data as message content. Analog values may include analog sensor values such as speed, acceleration, inclination, tire pressure, steering, and/or the like, and digital values may include digital sensor values such as switches to turn on or off a radio, headlights, fog lights, interior lighting, brake lights, and/or the like. Combinations of messages having digital content and messages having analog content may cause spikes in the deviation between the predicted and observed message patterns, bit patterns, or metadata patterns.

Many embodiments address the issue of spikes to, advantageously, avoid false positives by the MTS IDS. Such embodiments may identify different types messages and/or portions of different types of messages. With such messages, many embodiments observation windows that include one or more types of messages or portions of one or more different types of messages that can be combined, e.g., without exceeding a noise level threshold, without causing spikes in deviations, and/or other criteria. For instance, many embodiments may identify features such as messages with digital content and identify features such as messages with analog content. Such embodiments may determine some observation windows that view digital content without messages that include analog content as well as some observation windows that view analog content without messages that include digital content.

Reducing the noise levels in one or more of or all the observation windows evaluated by detection logic circuitry can, advantageously, increase the granularity of intrusion detection by an MTS IDS. Many embodiments implement one or more pattern recognition model and/or models based on expert knowledge of the in-vehicle network bus to identify different types messages and/or portions of messages in the traffic on the in-vehicle network bus.

MTS IDSs may employ a single, historical window of time such as 200 milliseconds for capturing traffic on an in-vehicle network bus such as a controller area network (CAN) bus. Many embodiments compare the previously captured, single static historic window of bus traffic against a current window of bus traffic to determine if the patterns of messages and/or portions of messages include an intrusion or attack. If the window of time for the single static historic window is too small, the single static historic window may include periodic messages with shorter periods but miss periodic messages in the traffic that have longer periods or longer gaps in time between transmissions. When such a message appears in the current window of the traffic, the detection logic circuitry may determine an increased deviation from the previously captured, single static window, which can potentially cause false positives.

Several embodiments address this issue by implementation of multiple and/or dynamic historic windows. Many embodiments capture the traffic on the in-vehicle network bus and select multiple historic windows of time or dynamically select historic windows of time of different sizes to improve detection of various attack types. Such embodiments may compare a current small window against a previously captured large historic window such as 250 milliseconds to determine if the current small window includes an intrusion. Such embodiments may identify one or more historic window sizes through hyperparameter tuning. Further embodiments may also vary the size of the current window.

Hyperparameter optimization or tuning is the problem of choosing a set of optimal hyperparameters for a machine learning algorithm. A hyperparameter is a parameter whose value is used to control the learning process. By contrast, the values of other parameters, such as node weights, are learned.

The same kind of machine learning model can require different constraints, weights or learning rates to generalize different data patterns. These measures are called hyperparameters and have to be tuned so that the model can optimally solve the machine learning problem. Hyperparameter optimization finds a tuple of hyperparameters that yields an optimal model which minimizes a predefined loss function on given independent data. The objective function takes a tuple of hyperparameters and returns the associated loss. Cross-validation is often used to estimate this generalization performance.

Many embodiments implement multiple window sizes during hyperparameter tuning to find a set of hyperparameters for a detection model of the detection logic circuitry. Some embodiments may capture multiple window sizes and tune the hyperparameters for each of more than one types of attacks such as flooding, suspension, masquerading, and/or the like.

In-vehicle network buses may not be synchronized but may include periodic and aperiodic messages from ECUs coupled with the bus. In other words, the timing for message transmissions may vary and, as a result, periodic messages may not transmit every x seconds. Periodic messages may transmit x seconds plus or minus 0.3 seconds after the prior transmission of the periodic messages. The transmission of aperiodic messages further distorts the timing of periodic messages since aperiodic messages may be transmitted in the middle of a periodic sequence of messages, delaying one or more messages in the periodic sequence. Such distortions may cause false positive detections of an intrusion.

More specifically, in-vehicle network buses may include arbitration to provide access to the in-vehicle network bus for transmission of messages. Periodic messages may have one of one or more standard levels of priority to access the bus and may transmit in groups of related messages. Aperiodic messages may have a high priority to access the bus due to relation to safety systems and/or the operation of the vehicle and may also transmit in groups. When a group of the periodic messages is stored in an outgoing queue for transmission on the bus from one or more of the ECUs, one or more of the periodic messages in the group have transmitted, and an aperiodic message with a higher priority arrives at an outgoing queue, the arbitration mechanism may provide access to the bus for transmission of the aperiodic message in the middle of a group of the periodic messages. For example, arbitration for CAN messages is based on the message identifier (ID) in the message.

Several embodiments address the problem arising from the transmission of aperiodic messages by implementation predictive modelling. Such embodiment may comprise a probabilistic model in the detection logic circuitry to identify groups of periodic messages and identify a relative order of the messages in the groups. With the groups of periodic messages and the relative order of the messages in the groups, the probabilistic model may predict the probability of the next arriving message on the in-vehicle network bus after the transmission of an aperiodic message.

Upon transmission of the aperiodic message in a first window of traffic in the middle of a periodic group of messages, the probabilistic model may determine that the message may be an aperiodic message and shift the probability for the next message arrival. In other words, if the message appears to be an aperiodic message or if the message is known to be an aperiodic message, the detection logic circuitry may effectively ignore the arrival of the aperiodic message for the purposes of detecting an intrusion if the next message to arrive is anticipated by the probabilistic model.

Some embodiments may implement predictive modelling with the probabilistic model may comprise a statistical model or may comprise a neural network model trained to predict the next message in a time series of messages. In some embodiments, the aperiodic messages may transmit in groups of predictable sequences. Such embodiments may implement hyperparameter tuning to select a window of time of traffic on the in-vehicle network bus to predict arrivals of aperiodic messages such as the aperiodic messages that follow the transmission of a first aperiodic message in a group of aperiodic messages with a predictable sequence.

Many embodiments may compliment the intrusion detectors in a system of IDSs. The system of IDSs may include groups of one or more IDSs in different observation layers. Observation layers (or layers), as discussed herein, refer to a perspective of review of information available at an in-vehicle network. For instance, the observation layers may include a physical layer, a message layer, a context layer, and, in some embodiments, one or more other layers. The physical layer refers to a perspective of an output of an ECU. At the physical layer, an intrusion detector may monitor a voltage or timing pattern output by the ECU. The ECU may output, e.g., messages as a sequence of bits to a bus of the in-vehicle network and the voltages represent bits with values of one or zero.

The message layer refers to a perspective of a time series or sequence of messages transmitted on the in-vehicle network bus by ECUs, sensors, actuators, and/or other communications device. The ECUs may, for example, provide data such as engine temperature, outside temperature, inside temperature, longitudinal acceleration/deceleration, speed, inclination, and/or the like. The sensors may provide readings to the ECUs over the in-vehicle network bus, and the actuators may receive instructions from an ECU over the in-vehicle network bus to perform a physical function such as applying brakes, applying the accelerator, turn left, turn right, and/or any other vehicle function that involves a physical action.

The in-vehicle network bus may comprise any kind of bus or bus system for transmitting and receiving messages between control units (ECUs), sensors, actuators, intrusion detectors, intrusion detection systems, and possibly other components. Some examples of in-vehicle network (IVN) buses include a Controller Area Network (CAN) bus, a CAN with flexible data-rate (CAN-FD) bus, a FlexRay bus, a local interconnect network (LIN) bus, an Ethernet, etc.

The context layer refers to a perspective of actions performed in the context of the vehicle state. For instance, if the state of the speed of the vehicle is 0 miles per hour, an ECU issued an instruction to accelerate the vehicle, the context layer may predict a change in the speed of the vehicle to be sensed by a speedometer cable or wheel sensors. The context layer may have specific information about the vehicle to facilitate a prediction that the speed will be, e.g., at 1 mph with a 5% margin of error upon receipt of the next message from the speedometer ECU. If the speedometer ECU transmits a message that indicates a speed of, e.g., 100 mph, the difference between the predicted speed and the observed speed (from the speedometer ECU) will likely exceed the residual threshold for the speed in the context layer and the context layer may transmit a message via the in-vehicle network and/or via another communications medium to the combined layer IDSs to indicate the suspected intrusion. For instance, some embodiments may establish a separate, secure communications medium for messages for combined layer IDSs.

Some embodiments may include one or more additional layers and may include one or more IDSs to monitor the one or more additional layers. For instance, some embodiments may treat external communications such as V2X communications as a distinct layer. Other embodiments may monitor the V2X communications via the in-vehicle network.

Machine learning may refer to a statistical model or an artificial intelligence model trained to detect patterns of messages or portions of messages in traffic on the in-vehicle network bus. The machine learning model may comprise a model trained via supervised training to classify activity as suspicious activity or not suspicious activity or trained to predict the next message in a sequence of messages. In some embodiments, the machine learning model may provide a probability that an activity is suspicious or not.

Types of attack may include, e.g., suspension attacks, flooding attacks, masquerading attacks, modification attacks, and/or the like. A suspension attack may involve a lack of messages transmitted by one or more ECUs. A flooding attack may involve transmission of over-whelming numbers of messages to prevent the timely transmission and receipt of messages via the in-vehicle network. A masquerading attack may involve one ECU transmitting messages with a source identifier (ID), or message ID, that identifies a different ECU. And a modification attack may involve, e.g., adjusting one or more values in a message from an ECU, e.g., by malicious code executing on the ECU. For instance, if the ECU for braking receives a sensor rating that indicates a first amplitude of braking, the malicious code may modify the amplitude in the message being transmitted to an actuator to accomplish the braking. The modification may increase the amplitude significantly to cause significantly more braking than expected based on the input from the braking sensor. The modification may decrease the amplitude significantly to cause significantly less braking than expected based on the input from the braking sensor. Or the modification may increase and decrease amplitudes of a sequence of braking messages to cause erratic behavior by the braking system.

The origin of the attack may identify one or more ECUs that are performing an attack. For instance, firmware of the origin ECU(s) may include malicious code and messages transmitted (and/or a lack thereof) may cause target ECU(s) to transmit erroneous signals or not to transmit predicted signals. Depending on the nature of the attack, one or more of the origin ECUs may also be target ECUs.

The compromised signals may include, e.g., unexpected or disproportionate acceleration, braking, and/or steering. The compromised signals may affect any one or more of various subsystems such as power locks, windows, turn signals, headlights, infotainment system, gauges, climate control, and/or the like.

While some of the specific embodiments described below will reference the embodiments with specific configurations, those of skill in the art will realize that embodiments of the present disclosure may advantageously be implemented with other configurations with similar issues or problems.

Various embodiments may be designed to address different technical problems associated with message time series intrusion detection. Other technical problems may include implementation of systems to detect intrusions in a message sequence in a first window of time when noise levels (variations) in the deviation from a preceding window cause a detection threshold to be set to avoid or attenuate false positives; to reduce false positives for MTS IDSs; to reduce false negatives for MTS IDSs; to reduce latency involved with detection of intrusions for MTS IDSs; to increase confidence involved with detection of intrusions for MTS IDSs; to minimize an attackers ability to reduce deviations detected below a static threshold for MTS IDSs; to reduce false positives related to a static historic window; to reduce false positives related to sporadic or aperiodic message transmissions and/or the like.

Different technical problems such as those discussed above may be addressed by one or more different embodiments. For instance, some embodiments that address problems associated with intrusion detection may do so by one or more different technical means, such as, memory and detection logic circuitry to capture traffic on an in-vehicle network bus during a first traffic window; filter the traffic within the first traffic window to determine more than one observation window, wherein the more than observation window comprises at least a first observation window and a second observation window, wherein the first observation window is different from the second observation window based on differences in filtering of the traffic between the first observation window and the second observation window; evaluate the more than one observation window to determine a first output based on a first observation window and a second output based on a second observation window, the first and second outputs to indicate if an intrusion is detected within the first traffic window; determine, based on a combination of the outputs, that the traffic on the in-vehicle network bus during the first traffic window comprises an intrusion; and output an indication of the intrusion; and/or the like.

Several embodiments comprise systems with multiple processor cores such as distributed processing systems, access points, and/or stations (STAs), sensors, meters, controls, instruments, monitors, Internet of Things (IoT) gear (watches, glasses, headphones, and the like), and the like for in-vehicle networks, V2X networks, V2V networks, V2I networks, V2P networks, V2D networks, and/or the like. In various embodiments, these devices relate to specific applications such as vehicle applications (automobiles, self-driving vehicles, other types of vehicles, and the like), and the like.

FIG. 1 depicts a block diagram of a motor vehicle 100 that may host an in-vehicle network (IVN). A contemporary motor vehicle 100 may include a complex network of controllers, sensors, inputs, and other data systems that may need to communicate with each other to ensure optimal operation of the vehicle. This can become a particularly complex problem in so-called smart cars, wherein the vehicle not only provides information to the end user or operator of the vehicle, but also takes control of some or all functions of the vehicle, either in certain limited circumstances, or in the case of self-driving cars, wholly autonomously.

A modern vehicle may include not only the electronic control unit (ECU) 104 that has been found in modern vehicles for decades, but may also include ECUs associated with sensors, computer vision systems, detectors, infotainment systems, and vehicle-to-everything (V2X) communication (i.e., vehicle-to-vehicle or vehicle-to-infrastructure communication systems, meaning that the vehicle may communicate not only with its own subsystems, but also with outside systems such as other vehicles, traffic information, weather information, and similar).

The introduction of V2X into the vehicle network provides a substantial new attack vector for malicious actors. Whereas before, the vehicle was a completely self-contained network with little or no outside network access, the introduction of V2X means that malicious actors now have an ingress interface into many vehicle networks. This provides attackers the opportunity to introduce malicious payloads such as injection or spoofing attacks, whereas before such attacks would have been nearly impossible without physically compromising a component within the vehicle itself.

In-vehicle network (IVN) buses arose in response to the demand for a vehicle's subsystems to be able to communicate with one another. Examples of IVN buses include a Controller Area Network (CAN) bus, a CAN with flexible data-rate (CAN-FD) bus, a FlexRay bus, a local interconnect network (LIN) bus, an Ethernet, etc.

One of the early IVN buses is the CAN bus. The CAN bus is defined by a robust standard that allows various devices to communicate with one another, particularly in environments that may lack a centralized host computer or other central controller unit. The CAN bus may operate on a multi-master serial monitor, wherein each device is known as a node. A node may be anything from a simple sensor with a single periodic output to a highly complex embedded computer (ECU) running sophisticated software. Modern automobiles may have as many as 70 electronic control units (ECU) for various subsystems.

The CAN bus is defined by the International Organization for Standardization's ISO 11898-2 specification, which defines a high-speed CAN bus unit using a linear bus terminated at each end with 120-ohm resistors. The CAN bus uses a differential signaling model, in which its physical implementation includes two wires named CANH and CANL. Whenever the node drives a "low," CANH and CANL respectively assume 3.5V and 1.5V signals, which are known as "dominant" signals. Whenever the node drives a "high," CANH and CANL both assume a 1.5V signal, which is known as "recessive." The termination resistor passively returns the two wires to a nominal differential voltage of 1.5 volts when not being driven.

To improve the safety and security of IVNs, it is advantageous to introduce an intrusion detection system (IDS) that can automatically inspect the bus and detect anomalies. It is possible to base such an IDS on voltage fingerprinting, message frequency, control, and/or other observation layer IDSs.

When an attacker performs, for example, a spoofing attack (e.g., masquerade attack, modification attack, etc.) such as changing the engine rotation or gear values, or an injection attack such as inserting fake messages (e.g., flooding attack), those established patterns are likely to be breached. As a result, anomalies in voltage fingerprint patterns, message time series data stream patterns, contextual message patterns, and/or the like may be taken as evidence of a potential intrusion.

Vehicle 100 may include a number of units that can become nodes of an IVN. For example, vehicle 100 may include a main electronic control unit (ECU) 104, which may be similar to the ECUs that are commonly used in cars to control things such as air fuel mixtures, acceleration, fuel injection, and similar functions. In some embodiments, a common ECU may not directly control the speed or direction of the car but may process a number of signals responsive to the user's inputs such as an electronic steering control, braking, acceleration, and similar. In some embodiments, the vehicle 100 may include a V2X interface 132 configured to perform communications such as vehicle-to-vehicle and vehicle-to-infrastructure communications.

The vehicle 100 may also include a number of other sensors and processors, and the number and type of these may be related to the type of vehicle. For example, a low-end, inexpensive vehicle may have only a small number of sensors, while a vehicle with electronic assist functions may have a much larger set of functions, and an autonomous, self-driving vehicle may have an even larger set of functions to support the self-driving feature. By way of illustrative and nonlimiting example, vehicle 100 may include a speedometer 140, tire pressure sensors 108, an ultrasonic sensor 128, a radar 124, a front camera 116, a rear camera 112, lane following sensors 120, and ambient temperature sensors 136. Other sensors and subsystems 142 may include, by way of nonlimiting example, a tachometer, a compass, a GPS, an accelerometer, an automatic braking system, an automatic traction control system, steering control subsystems, and others.

Each of these systems may communicate with one or more others of the systems. To communicate with other systems, a node on the IVN may broadcast a message to the bus with a header identifying the source of the message (source or message identifier) and also optionally identifying the target of the message. IVNs usually operate in a broadcast manner, thus all of the nodes on the IVN may receive the message, and those messages that are not the target or that do not need the message may simply discard or ignore the message.

Figure 2:
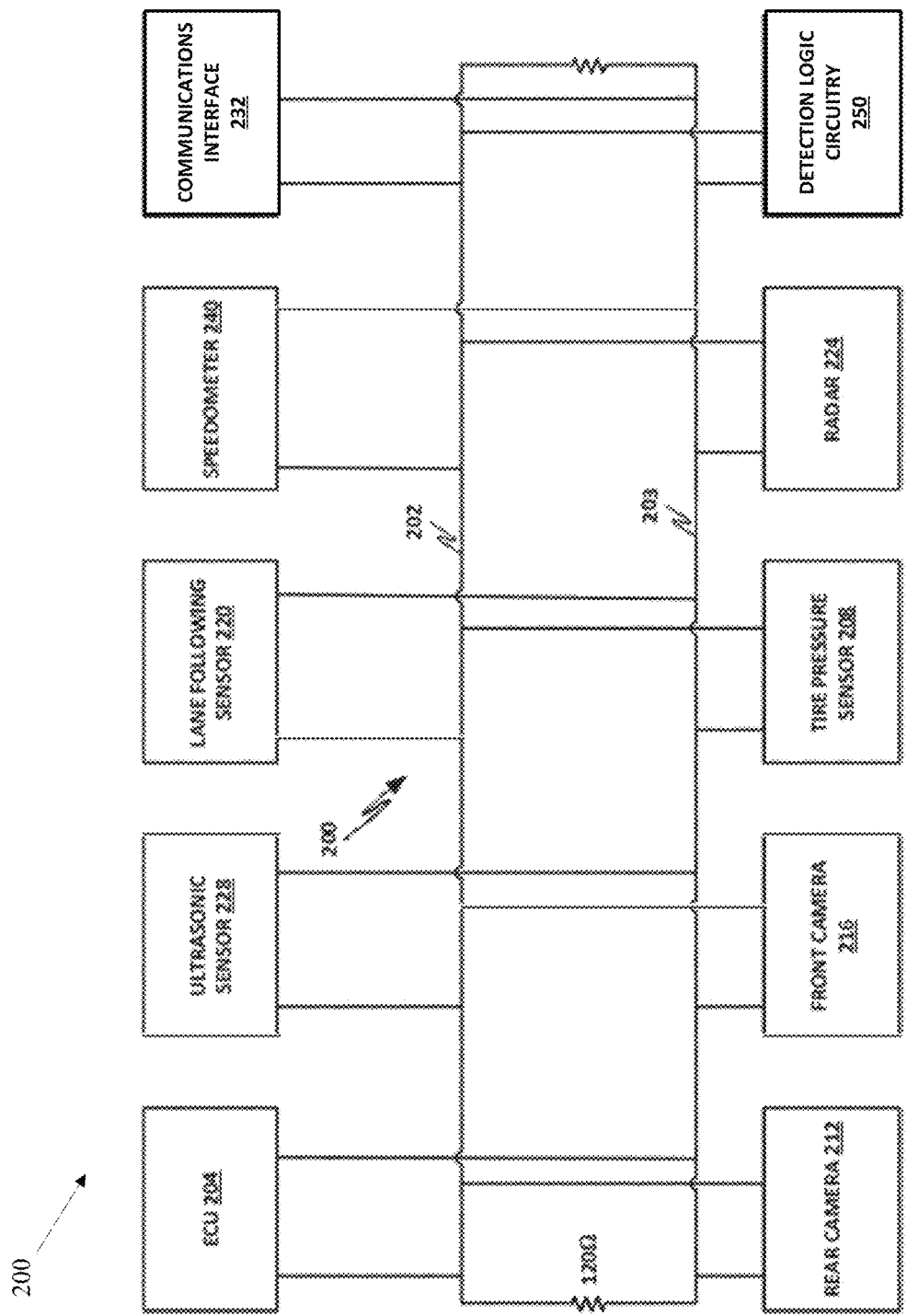
FIG. 2 depicts an embodiment of a block diagram of systems connected to an IVN.

FIG. 2 depicts an embodiment of a block diagram of systems connected to an IVN. In the present embodiment, the IVN bus is a CAN bus 200 that includes a high voltage wire 202 and a low voltage wire 203. Nodes on the CAN bus 200 may communicate by driving signals onto high voltage wire 202 and a low voltage wire 203 to represent logical zeroes and ones. The high voltage wire 202 and a low voltage wire 203 are terminated at their ends by a pair of 120-ohm resistors. In some embodiments, nodes connected with other IVN buses may operate in a corresponding manner.

By way of illustrative and nonlimiting example, the CAN bus 200 has attached to it a number of nodes including an ECU 204, an ultrasonic sensor 228, a lane following sensor 220, a speedometer 240, a V2X interface 232, a rear camera 212, a front camera 216, tire pressure sensors 208, a radar 224, and a detection logic circuitry 250. One or more of the nodes may include an ECU to, e.g., process sensor data or other data to perform a vehicle function or to display the sensor information to a user.

Various nodes on the CAN bus 200 may be considered to be peer nodes, and no node is necessarily elected or designated as a "master node." However, the detection logic circuitry 250 may have particular security functions. Specifically, detection logic circuitry 250 may be configured to monitor CAN bus 200, detect possible anomalies, and identify the possible anomalies as possible intrusions. In the case that detection logic circuitry 250 identifies an anomaly or intrusion, the detection logic circuitry 250 may output an indication of the attack profile to a forensic logging and/or recovery system to log anomalies and/or to take appropriate remedial action, such as restarting an ECU, redirecting ECU operations to a backup ECU, warning an operator of the vehicle, querying an outside security vendor via the communications interface 232, and possibly forcing the vehicle to a safe resting position until the anomaly can be resolved and the vehicle can again be operated safely.

Figure 3:
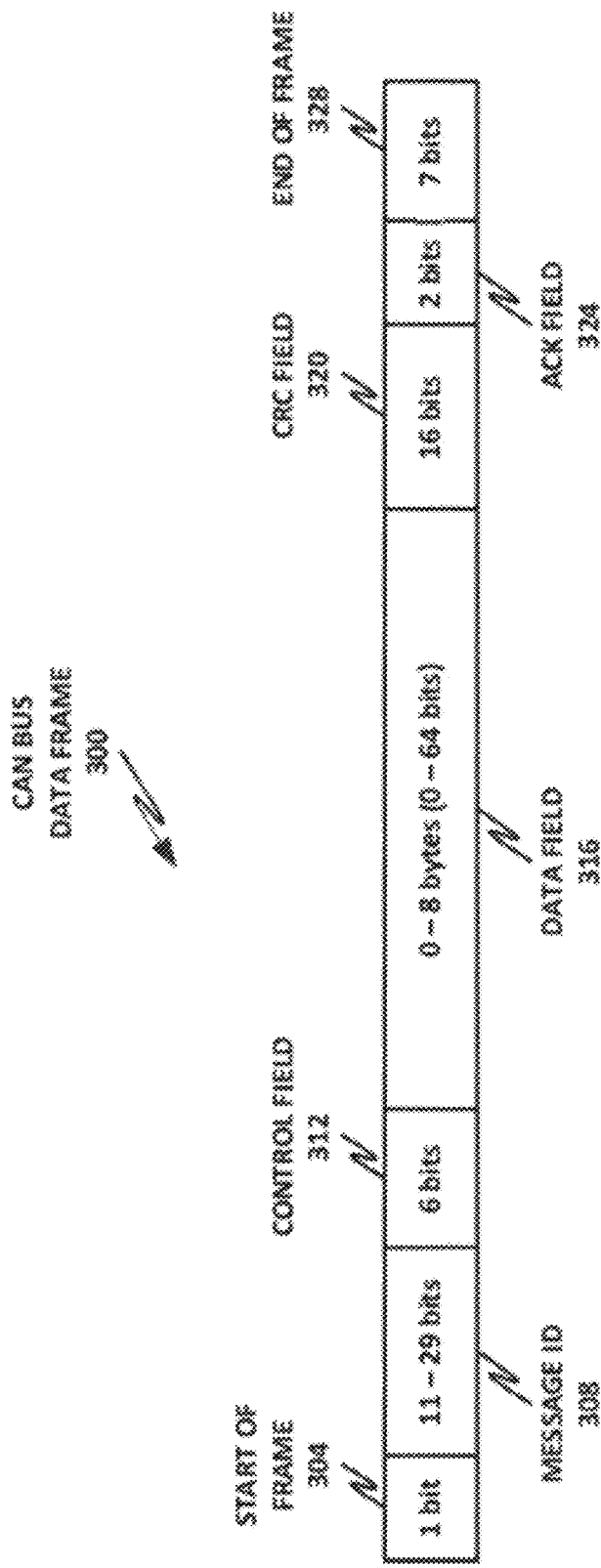
FIG. 3 depicts an embodiment of a block diagram of a control area network (CAN) bus data frame.

FIG. 3 depicts an embodiment of a block diagram of a CAN bus data frame 300. The CAN bus data frame 300 may include a 1-bit starter frame flag 304, followed by a message identifier (ID) 308. The message ID 308 may be between 11 and 29 bits that identify the set of signals transmitted in a data field 316. For in-vehicle network buses such as the CAN bus, the message ID 308 may also identify a priority of the message for the purpose of arbitration of the access to the CAN bus. For instance, ECUs may couple with bus interfaces with, e.g., transceivers to transmit messages on the CAN bus. The bus interfaces may include queues (memory) for buffering messages for transmission on the CAN bus and an arbitration logic circuitry, which may be centralized in a master arbitration integrated circuit or may be decentralized amongst one or more or all transceivers or ECUs, may arbitrate access to the CAN bus for queued messages. The arbitration logic circuitry may determine a priority of the queued messages based on the message IDs of the queued messages.

The CAN bus data frame 300 may also include a control field 312, which provides control data such as whether this is a standard or extended frame and a to request remote frames. The control field 312 may also include four bits that indicate the length of the data field.

The payload of CAN bus data frame 300 is included in the data field 316, which may include between 0 and 8 bytes (0 to 64 bits). The data field 316 is followed by a circular redundancy check (CRC) field 320 which is used for error detection. An ACK field 324 is used to transmit acknowledgments. And a 7-bit end of frame 328 terminates the CAN bus data frame 300.

The CAN bus data frame 300 includes up to 8 bytes of payload in data field 316 and, depending on the application, the data field 316 may be further partitioned into subfields that carry specific content. For example, a specific subfield may be used to carry the rotations per minute (RPM), wheel angles, speed, or other data points. In the automotive context, it has been observed that the majority of CAN bus messages are sent at regular time intervals. So, by examining a sequence of the same type of messages (for example, with the same message ID), it is possible to observe certain predictable patterns. Patterns may also be observed in a sequence of messages covering multiple types of messages.

A message sequence M on the CAN bus may be modeled as $M=\{ \ldots, m_{i-1}, m_{i+1}, \ldots \}$, where $m_i$ is one of the messages and i describes the message ordering. Each message $m_i$ may contain up to 8 bytes of data in the data field 316, which may be modeled as $D_i=\{ \ldots, d_j\}$, where $D_i$ is 1 byte and $1<j<=8$. Each individual byte may be interpreted as an individual decimal or hexadecimal value between 0 and 255 (or in the case of hexadecimal, between 0 and FF).

Considering the jth byte of all messages broadcast on the CAN bus within a time period, a numerical time series may be observed. For example, consider a case where the first byte is selected, and the first byte of each CAN bus data frame is plotted as a value between 0 and 255.

Observationally, it has been found that this time series can be modeled according to a regular data pattern. Note that different types of messages might have the same or similar data payloads, but over a time series, examining a fixed byte of a series of CAN bus data frames tends to yield similar graphs. Thus, when an attacker performs an attack on the CAN bus, such as via injection or spoofing, the malicious payload interrupts the normal series of the data stream, thus representing a deviation from the normal pattern. The present specification uses a time series anomaly detection scheme to identify anomalies in the data stream and identify them as potentially malicious.

Note that other in-vehicle network buses may include different frame configurations. Such frame may include fields such as (i) frame headers/footers, (ii) size of the frame, (iii) the routing of the frame, (iv) if the frame transmission was preempted and/or split/combined (IEEE 802.3br), (v) credits in a credit based-queueing (IEEE 802.1Qav). IEEE 802.3br is superseded by IEEE 802.3-2018—IEEE Standard for Ethernet published Aug. 31, 2018 and IEEE 802.1Qav is superseded by 802.1Q-2011—IEEE Standard for Local and metropolitan area networks—Media Access Control (MAC) Bridges and Virtual Bridged Local Area Networks, published 2011.

Figure 4:
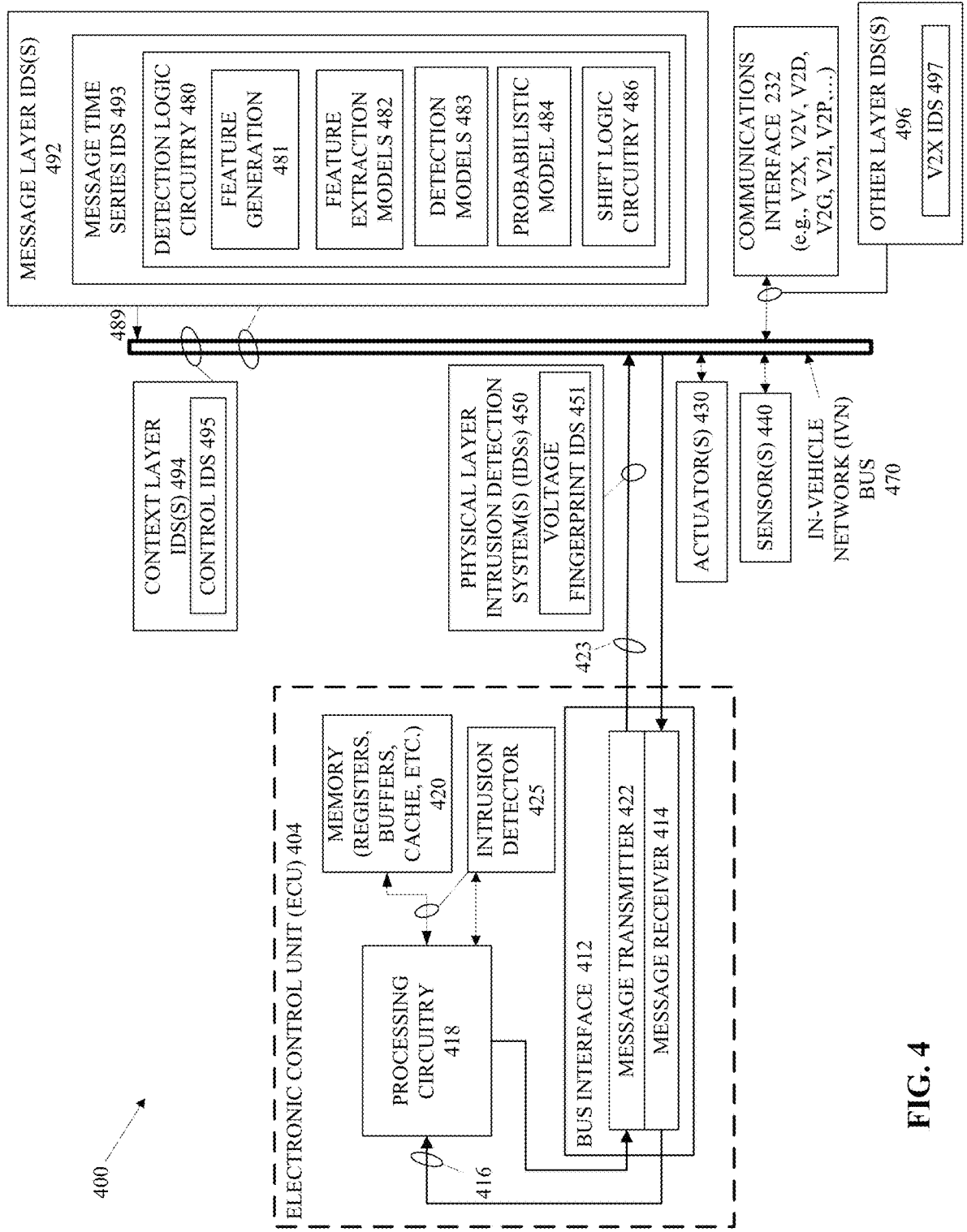
FIG. 4 depicts an embodiment of is an electronic control unit (ECU) and multiple layers of IDSs.

FIG. 4 depicts an embodiment 400 of is an electronic control unit (ECU) 404 and multiple layers of IDSs. The ECU 404 may comprise an ECU to process sensor information from the sensor(s) 440 such sensor information discussed in conjunction with FIGS. 1-2. The ECU 404 is just one example of an ECU and is configured to transmit a message on the in-vehicle network (IVN) bus 470 to the actuator(s) 430. The actuator(s) 430 may implement a physical process based on the messages from the ECU 404 and the sensor(s) 440 may detect a physical change based on activation of the actuator(s) 430 to provide feedback to the ECU 404 and/or other ECUs. Other embodiments may implement a different in-vehicle network.

In some embodiments, the ECU 404, memory 420 coupled with the ECU 404, and the bus interface 412 may reside on a single printed circuit board, may reside within a single chip package, and/or may reside on a single integrated circuit such as a system on a chip (SoC). Further embodiments of the ECU 404 may include an intrusion detector 425 and the intrusion detector 425 may reside on a single printed circuit board, may reside within a single chip package, and/or may reside on a single integrated circuit such as a system on a chip (SoC). In other embodiments, the intrusion detector 425 may couple with the ECU 404.

The ECU 404 may receive an input such as a reference signal 416 at the processing circuitry 418 via a message receiver 414 of the bus interface 412. The reference signal 416 may indicate an operation to be performed by a vehicle such as a magnitude of acceleration based on user input. The ECU 404 may transmit actuation commands via the message transmitter 422 of the bus interface 412 to direct operation of actuator(s) 430 via the IVN bus 470. The actuator(s) 430 may receive the actuation commands and perform a physical process, and the sensor(s) 440 may obtain sensor measurements of the components of the vehicle. The sensor(s) 440 may transmit or pass the sensor measurements to the processing circuitry 418 of the ECU 404.

The intrusion detector 425 may comprise logic circuitry configured to detect intrusions from a particular perspective such as an internal ECU layer. For instance, the sensor(s) 440 may comprise an accelerometer and the ECU 404 may control acceleration/deceleration responsive to input from a user. The intrusion detector 425 may monitor calls to read and store code and data in the memory 420 to determine if such calls deviate from a typical or standard pattern of reads and stores of code and or data. If the intrusion detector 425 determines that a deviation of the calls to read and store code and data exceeds a deviation threshold, the intrusion detector 425 may perform one or more operations to reduce the deviation such as rebooting the ECU or replacing the ECU 404 with a backup ECU, and/or the intrusion detector 425 may transmit an output indicative of the deviation, of a probability of an intrusion based on the deviation, and/or the like. In many embodiments, the intrusion detector 425 may transmit an indication of an intrusion via the IVN bus 470. In other embodiments, the intrusion detector 425 may transmit an indication of an intrusion via another bus or other medium. Other embodiments may include other types of intrusion detectors to monitor the ECU at other layers.

The memory 420 may include, e.g., registers, cache, buffers, etc. to store code and data for the processing circuitry 418. The bus interface 412 may transmit and receive messages such as the CAN bus data frame 300 shown in FIG. 3 and may include buffers or queues to store incoming and/or outgoing messages while awaiting processing by the processing circuitry 418 or transmission via the IVN bus 470. In many embodiments, the message transmitter may build and transmit, via a output 423 with the IVN bus 470, an IVN bus data frame such as the CAN bus data frame 300 and include message IDs that are unique to ECU 404. Furthermore, the message receiver 414 may receive messages via the IVN bus 470 and discard and/or discontinue receipt of messages that are not intended for ECU 404 or that are not from a message source that the ECU 404 will receive. For instance, message receiver 414 may discard a message or ignore a message that does not originate from the expected ECU transmitted. The message receiver 414 may discard a message or ignore a message that does not include the message ID of a source ECU or message ID for sensor(s) 440 in the message ID field of the message that the receiver 414 is configured to receive.

The IVN bus 470 may have multiple ECUs such as the ECU 404. Each ECU may be associated with and/or may provide information for use by one or more of the vehicle sub-systems connected to the IVN bus 470. While the ECUs may be configured similarly or differently from the ECU 404, each of the ECUs may couple with the IVN bus 470 via a bus interface such as the bus interface 412 to transmit and receive messages.

The IVN bus 470 may include one or more observation layers with IDSs. The intrusion detector may reside at an internal ECU observation layer. Physical layer IDSs 450, message layer IDSs 492, and context layer IDSs 494 may monitor external signals of the ECU 404. For example, the physical layer IDSs 450 may include a voltage fingerprint (FP) IDS 451 to monitor voltage patterns on the output 423 of the message transmitter 422 of the bus interface 412. The voltage FP IDS 451 may detect patterns of bits based on voltages output from the message transmitter 422 to the IVN bus 470. To illustrate, the voltage FP IDS 451 may monitor the output 423 for an end of frame pattern and a start of frame bit to identify the start of a message ID in an IVN bus data frame such as the CAN bus data frame 300. Upon identification of the start of the message ID, the voltage FP IDS 451 may compare the pattern of voltages for the message ID to the message ID for the ECU 404 to determine if the ECU is correctly identifying the source of the messages being transmitted from the ECU 404.

If the ECU 404 is not including the correct message ID in each transmitted frame, the voltage FP IDS 451 may transmit a message to the detection logic circuitry 480 via a detection logic communications medium or via the IVN bus 470. The message may indicate the occurrence of suspicious activity by the ECU 404.

The message layer IDSs 492 may include a message time series (MTS) IDS 493 to monitor a sequence of messages transmitted by the ECU 404 or a group of ECUs including the ECU 404. In many embodiments, the MTS IDS 493 may establish one or more windows of time (traffic windows) during which the MTS IDS 493 captures a sequence of messages on the IVN bus 470. The MTS IDS 493 may interpret the sequence of messages to determine if the pattern of messages in the sequence of messages deviates from the a pattern of messages learned by one or more detection models 483 for the ECU 404 specifically, for a group of ECUs including the ECU 404, for a group of ECUs that consume messages from the ECU 404, for all ECUs, and/or for all messages transmitting via the IVN bus 470.

In some embodiments, the MTS IDS 493 may determine a deviation between the observed sequence of messages and the predicted sequence of messages and compare the deviation to a dynamic threshold deviation to determine whether the observed sequence of messages represent suspicious activity. If the observed sequence of messages represents suspicious activity, the MTS IDS 493 may transmit a message to the detection logic circuitry via the IVN bus 470.

In further embodiments, the MTS IDS 493 may include detection logic circuitry 480 to implement machine learning models such as feature generation logic circuitry 481 to determine various observation windows, feature extraction models 482 to extract features such as messages, portions of messages, bit patterns, the metadata of messages, the size of messages, the priority of messages, or the routing of messages from the various observation windows to create feature vectors, and detection models 483 to detect inconsistencies in benign message pattern in traffic on the IVN bus 470 based on the feature vectors. In many embodiments, the feature extraction models 482 may be trained to extract message patterns (feature vectors) from various vantage points (observation windows) from a traffic window and provide the message patterns to the detection models 483 to process.

The detection logic circuitry 480 may also comprise a probabilistic model 484 and a shift logic circuitry 486. The probabilistic model 484 may comprise prediction modeling of the ordering of groups of one or more messages in a message sequence and the shift logic circuitry 484 may detect and remove sporadic messages or groups of sporadic messages from observation windows and/or feature vectors so the detection models 483 may ignore the presence of the sporadic message(s). In some embodiments, the probabilistic model 484 may detect intrusions by detection of messages that are not sporadic messages that change message orders of one or more groups of messages.

The sporadic message may be a message that is not transmitted on a periodic basis. Such messages may have a high priority for transmission and disrupt normal patterns of periodic messages. In many embodiments, the sporadic message may trigger additional sporadic messages to form a group of sporadic messages.

In some embodiments, the detection logic circuitry 480 may capture and provide historic windows that capture groups of the sporadic messages so that the probabilistic model 484 may model the probability of a sporadic message falling within an observation window. For instance, a sporadic message may include a brake input from a user. The brake input has a high priority as part of the safety systems in the vehicle. The brake input may initiate additional brake related messages such as a braking message to an actuator, a braking sensor message from a sensor that measures the actions of the actuator, and a braking feedback message to provide feedback to the user such as an indicator on a dashboard or other indication. Since the braking is based on user input, the message with the brake input from the user is a sporadic message. Furthermore, each additional brake related message is generated in response to the first sporadic message so first sporadic message is part of a predictable sequence or group of messages that are sporadic. Thus, the probabilistic model 484 may observe the sequence of the group of sporadic messages and generate a prediction profile to indicate the probabilities that the sequence of sporadic messages will occur with a predictable timing after the transmission of the initial sporadic message with the brake input from the user.

Based on the prediction profile generated via a statistical or other machine learning model, the probabilistic model 484 may pass information to the shift logic circuitry the group of sporadic messages from the observation windows or otherwise allow the detection models to ignore the presence of the group of sporadic messages. The probabilistic model 484 may also or alternatively determine whether the sporadic message and/or group of sporadic messages represent an intrusion based on a deviation from predicted behavior.

The detection logic circuitry 480 may comprise code and data to execute in an ECU such as the ECU 404 with processing circuitry 418, memory 420, and a bus interface 412. In some embodiments, the detection logic circuitry 480, as well as other ECUs like ECU 404, may comprise code and data stored in flash memory (or other non-volatile, reprogrammable memory) and have a processor with registers and/or buffers and/or other random access memory to execute code loaded from the flash memory.

The context layer IDSs 494 may include a control IDS 495 to monitor messages transmitted by the ECU 404 or a group of ECUs including the ECU 404. In many embodiments, the control IDS 495 may establish one or more windows of time (or time periods) during which the control IDS 495 captures messages on the IVN bus. The control IDS 495 may interpret the messages to compare messages from the ECU 404 and/or a group of messages from ECUs associated with the ECU 404 to determine if any one or more of the messages presents information that contradicts a context of the vehicle within which the ECU 404 and the detection logic circuitry 480 resides. For example, the ECU 404 may transmit messages including a speed detected by a speed sensor. The speed sensor of the sensor(s) 440 may comprise a set of wheel sensors that transmit pulses as the wheel rotates. The wheel sensors may transmit a message to the ECU 404 including a number associated with the number of pulses detected by the wheel sensors over a defined period of time. The ECU 404 may calculate the speed based on the number of pulses indicated and may transmit a message on the IVN bus 470 indicating the speed at which the vehicle is traveling.

The control IDS 495 may receive the message from the ECU 404 with the speed and compare the speed with a speed calculated by another ECU based on receipt of GPS information.

The comparison may result in a residual difference in the speed determined via the GPS information and the speed determined via the wheel sensors. Thereafter, the control IDS 495 may compare the residual difference between the speeds to a detection threshold and transmit an indication about suspicious transmissions if the residual difference exceeds the detection threshold.

In the present embodiment, the IVN bus 470 may receive communications from outside of the in-vehicle network via a communications interface 232 such as a V2X, V2V, V2D, V2G, V2I, and V2P communications. For example, the vehicle (such as the vehicle 100 shown in FIG. 1) may receive, e.g., messages from infrastructure like markers in the road or on the side of the road or via other vehicles on the road. The markers may be, e.g., mile markers (or partial mile markers such as 100 yards, 200 yards, etc.) that may also provide other information such as lane positioning and a vehicle such as the vehicle 100 may include an ECU such as ECU 404 to receive information from the communications interface 232 via the IVN bus 470. In other embodiments, the ECU may receive the information via another network (such as a wireless network) or bus, or a different type of in-vehicle bus.

The present embodiment may also comprise other layer IDSs 496 to monitor communications received via the communications interface 232 for intrusion. The other layer IDSs 496 may include a V2X IDS 497 to monitor V2X messages received via the communications interface 232 as the messages are communicated to one or more ECUs via the IVN bus 470. The V2X IDS 497 may monitor incoming and/or outgoing messages via the communications interface 232 based on one or more of various techniques such as measuring the voltage FP of the messages.

The message layer IDSs 492 may also include, e.g., an MTS IDS 493 to monitor messages specifically from the communications interface 232 for V2X, all messages from the communications interface 232, all message related to a sub-system that utilizes V2X messages, all messages on the IVN bus 470, and/or the like.

Figures 5A, 5B:
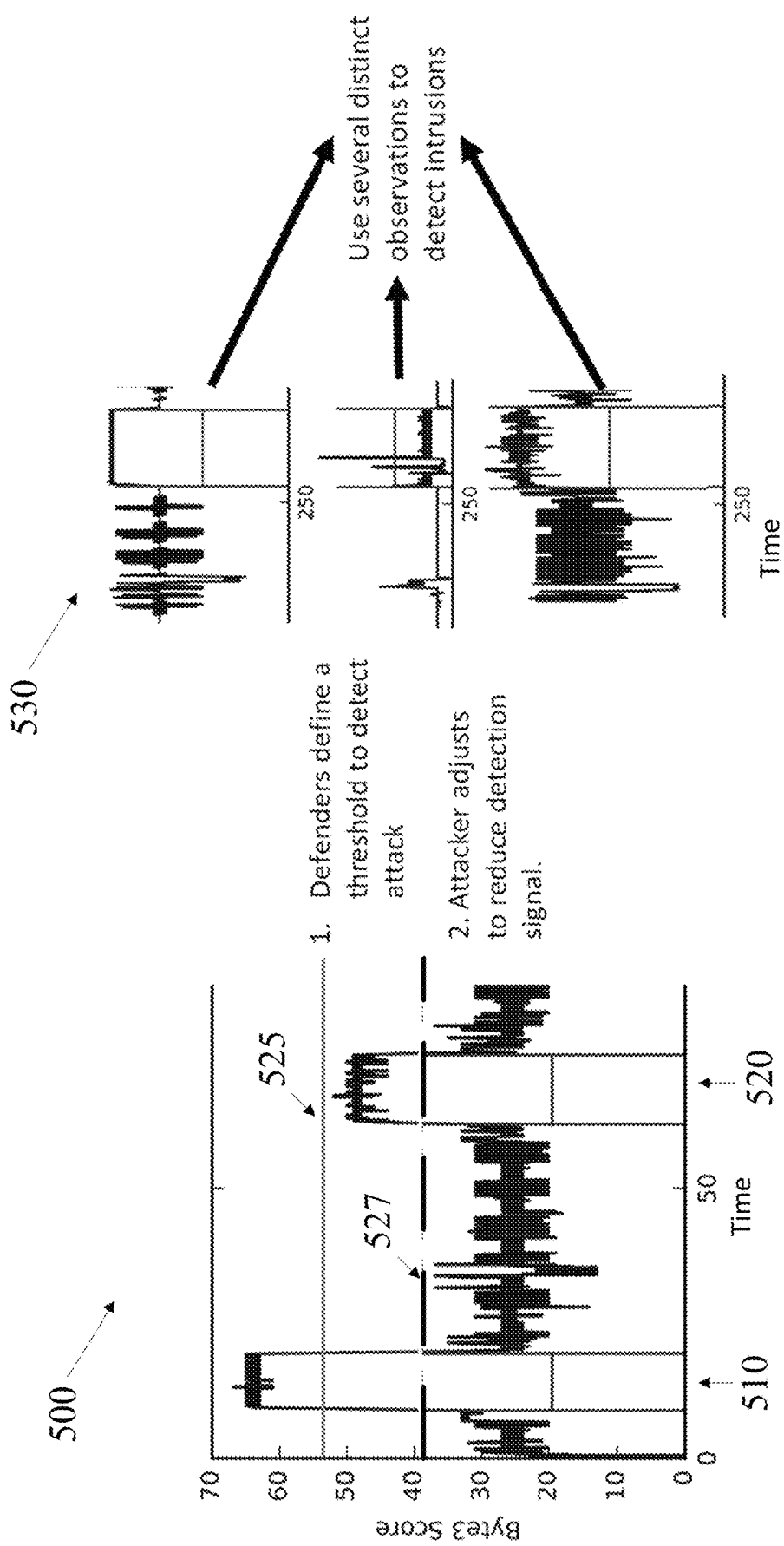
FIGS. 5A-B depicts an embodiment of generation of multiple observation windows for an MTS IDS.

FIGS. 5A-B depicts an embodiment of the generation of multiple observation windows for an MTS IDS. In particular, the graph in FIG. 5A illustrates a timing diagram 500 showing intrusion detection as deviations of observed activity from predicted activity with a static detection threshold 525. The first attack 510 shows a significant deviation from the predicted activity on the in-vehicle network bus. The second attack 520 shows that the deviation from the predicted activity is less and may result from an adjustment to the attack parameters to avoid detection by a static threshold.

Furthermore, the line 527 shows the amplitude of the noise (or noise level) from the perspective of the deviation from predicted activity for the traffic on the in-vehicle network bus. Note that the noise level at line 527 limits the placement of the detection threshold 525 since reducing the detection threshold below that line 527 will cause false positive detections by benign traffic on the in-vehicle network bus.

FIG. 5B illustrate deviations in three timing diagrams 530 with respect to predicted activity for three different observation windows presented by some embodiments. The observation windows include three different filters of the traffic on the in-vehicle network bus during the same traffic window. Some embodiments may compare the filtered traffic to predicted activity based on the respective filters to generate the deviations shown in the three timing diagrams 530. Other embodiments may implement feature extraction models such as the feature extraction models 482 in FIG. 4 to create feature vectors from each observation window and process the feature vectors with detection models such as detection models 483 trained to detect intrusions based on the respective filtered views of the traffic on the in-vehicle network bus.

By filtering the traffic to generate various vantage points from which to observe the traffic on the bus, some embodiments may facilitate detection of intrusions with a lower latency and/or a higher confidence that may perform well across a variety of attack types.

Figure 6A:
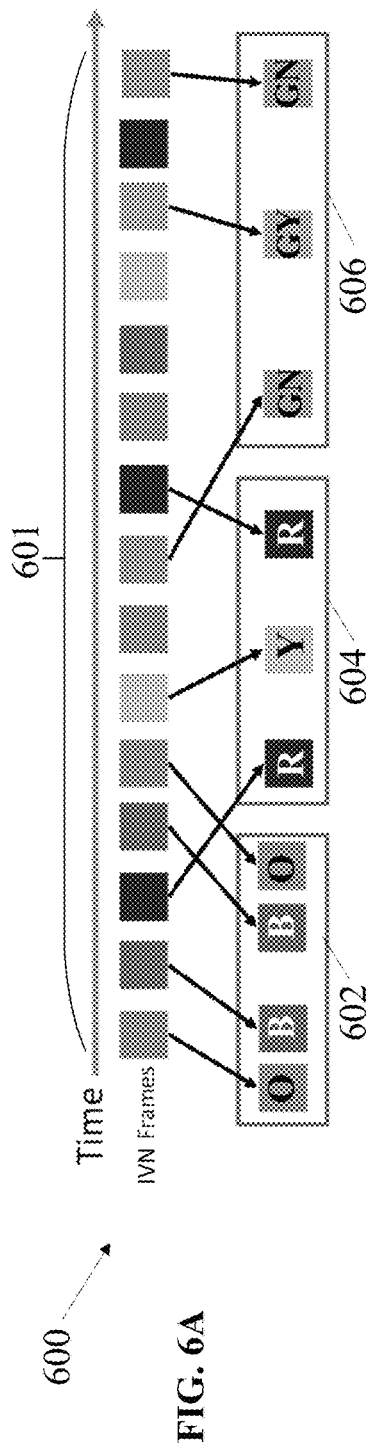
FIGS. 6A-C depicts an embodiment of filtering for a traffic window to reduce the noise level in deviations from predicted activity in the traffic on an in-vehicle network bus.
Figure 6B:
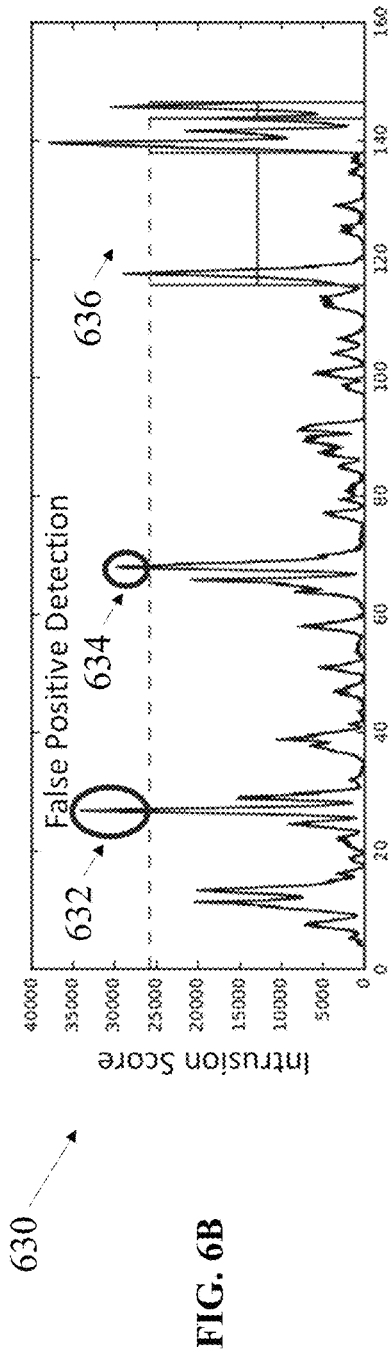
Figure 6C:
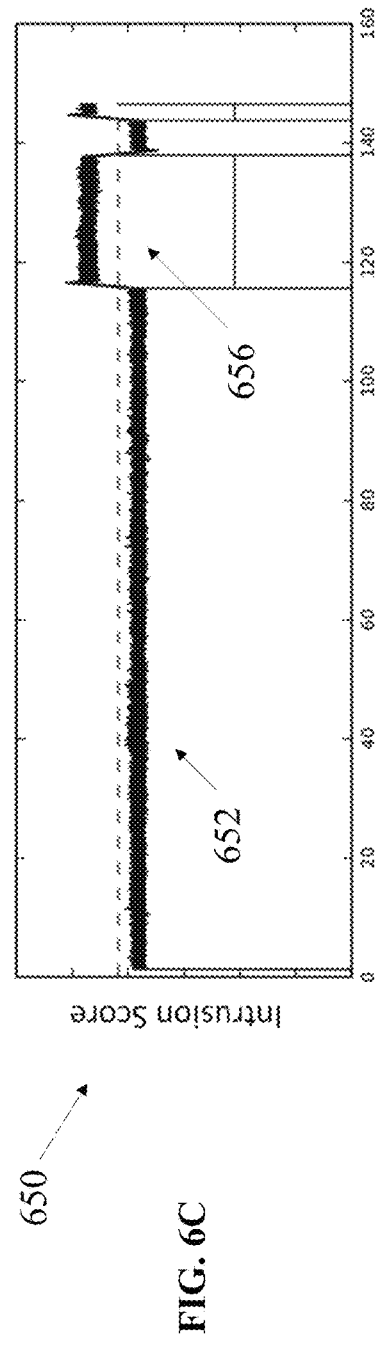

FIGS. 6A-C depicts an embodiment of filtering for a traffic window to reduce the noise level in deviations from predicted activity in the traffic on an in-vehicle network bus. FIG. 6A depicts a timeline 600 of sequences of messages in the IVN. The arrows show a filtering process to generate three observation windows 602, 604, and 606. The observation window 602 may be a filtered view of a traffic window 601 that includes only "O" orange messages and "B" blue messages. The observation window 604 may be a filtered view of a traffic window 601 that includes only "R" red messages and "Y" yellow messages. The observation window 606 may be a filtered view of a traffic window 601 that includes only "GN" green messages and "GY" gray messages. In many embodiments, combinations of types of messages or message content within the same observation window are selected by feature generation logic circuitry, such as the feature generation logic circuitry 481 shown in FIG. 4, to reduce the noise level in an intrusion score.

FIG. 6B depicts a timeline 630 of an intrusion score (deviations from predicted activity) of traffic on the IVN based on a view of the traffic window 601. Note that the peaks 632 and 634 represent benign activity that causes spikes due the nature of the messages, such as combinations of digital and analog message content. The attack 636 in the view of all the traffic in the traffic window is difficult to distinguish from the benign activity based on a static threshold.

FIG. 6C depicts a timeline 650 of an intrusion score (deviations from predicted activity) of traffic on the IVN based on a view of the observation window 602. Note that the deviations 652 show a significantly reduced noise level, which more clearly distinguishes the attack 656 from the benign traffic on the bus.

Figures 7A, 7B:
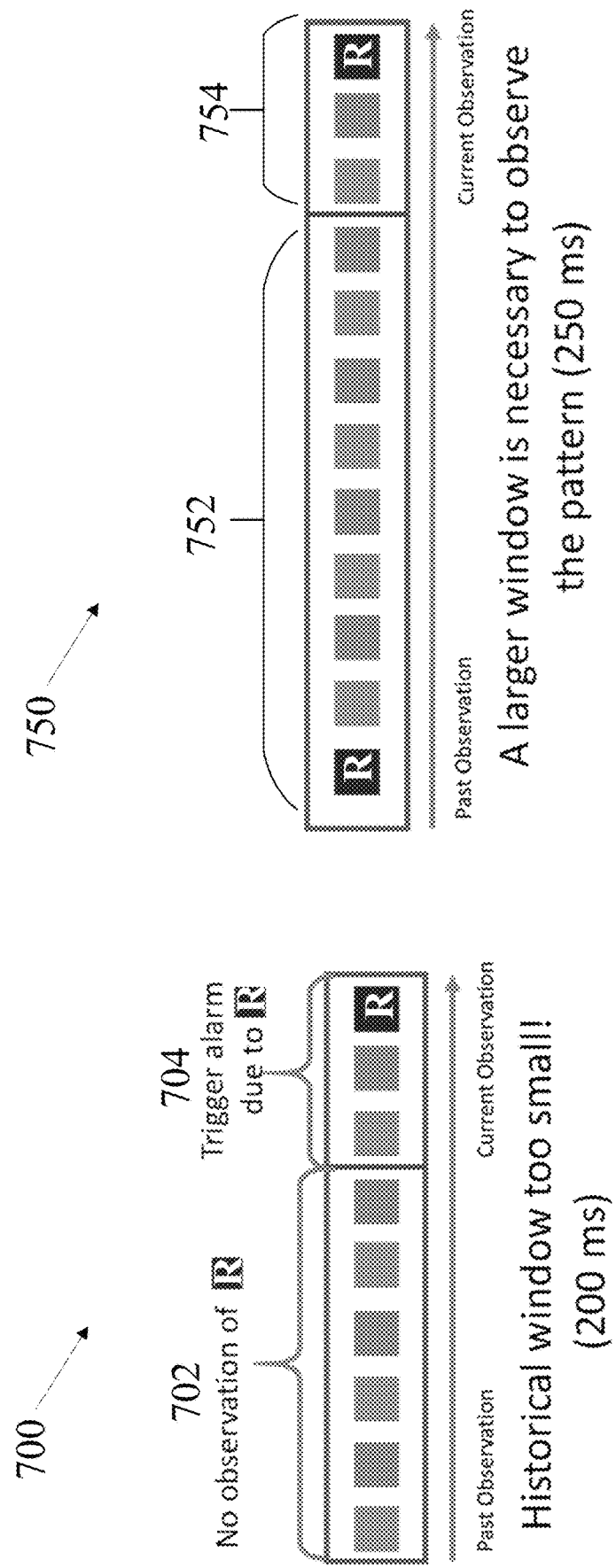
FIGS. 7A-B depict a small historic window versus a large historic window for evaluation of the message sequence in a current observation window.

FIGS. 7A-B depict a small historic window versus a large historic window for evaluation of the message sequence in a current observation window. The window 700 in FIG. 7A illustrates a situation in which the size of the historical window 702 is about 200 milliseconds. In this embodiment, the historical window 702 is too small because a benign, periodic "R" red message occurs in the current observation window 704 but not in the historical window 702, causing a detection logic circuitry to potentially trigger an alarm to indicate an intrusion.

The window 750 in FIG. 7B illustrates a situation in which the size of the historical window 752 is about 250 milliseconds. In this embodiment, the historical window 752 is a correct size for comparison with the current observation window 754 because a benign, periodic "R" red message occurs in both the historical window 752 and the current observation window 754. As a result, the detection logic circuitry may recognize the "R" red message as benign.

The larger historical window 752 may increase the latency of detection but decrease the false positive detection of intrusion. Many embodiments address this issue by implementing dynamic windows that adjust the size of the historical window to attempt to encompass the message types included in the current observation windows 702 and 752. Other embodiments may implement multiple historical window sizes and compare the current observation windows 702 and 752 to each of the multiple historical window sizes to reduce the false positive rate for detection. For instance, if the "R" red message was an attack, the detection logic circuitry may detect the attack regardless of the historical window size but if the "R" message is benign, the detection logic circuitry may determine that the "R" red message is benign in at least one of the historical window sizes.

Figure 8:
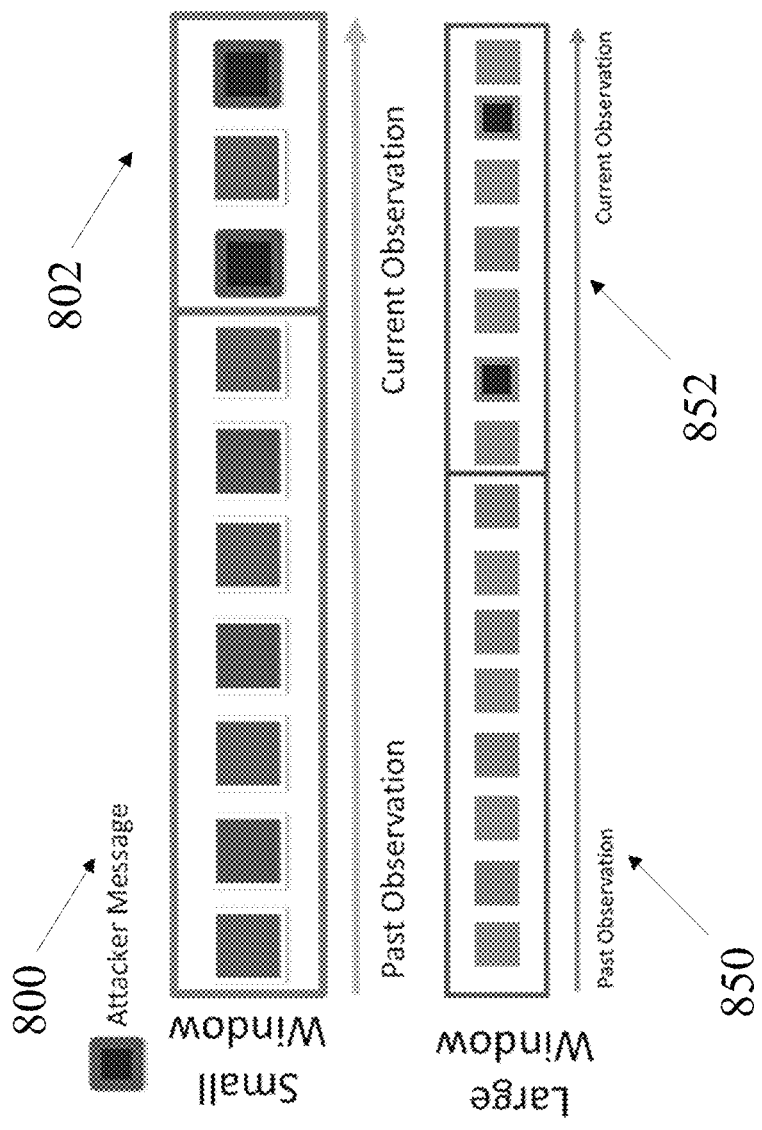
FIG. 8 illustrates the use of multiple sizes of historical windows and multiple sizes of current observation windows.

FIG. 8 illustrates the use of multiple sizes of historical windows 800 and 850 and multiple sizes of current observation windows 802 and 852 to improve detection of various types of attacks. The use of the small current observation window 802 with the small historical window 800 may be good for detecting aggressive attacks with a low attack detection latency. However, such detections may be susceptible to false positives due to noise.

The use of the large current observation window 852 with the large historical window 850 may be better detection for gradual attacks with a low false positive detection rate. However, such detections may a high detection latency.

Figure 9:
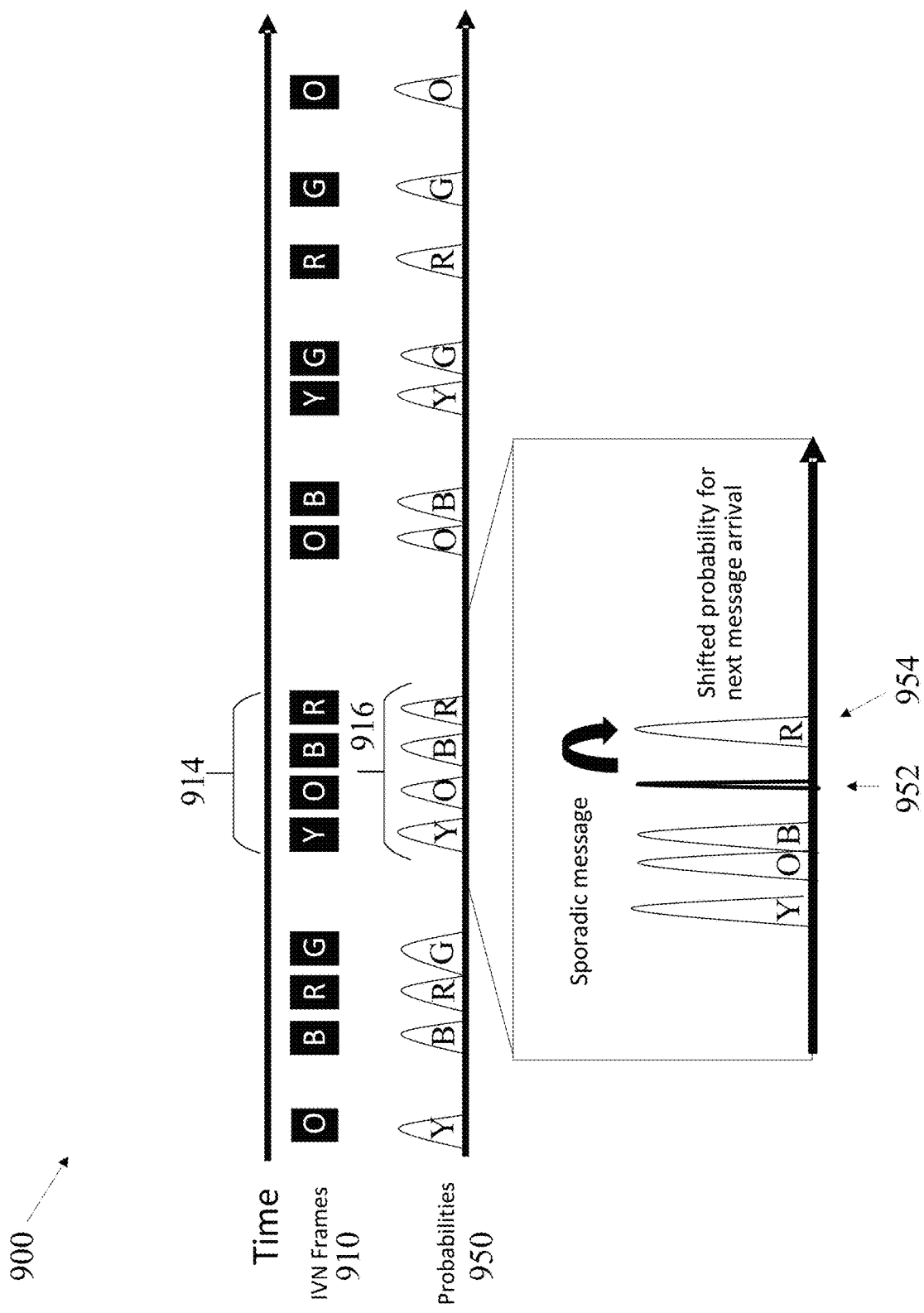
FIG. 9 depicts message ordering and probabilities in a traffic window and the effect and disposition of a sporadic message.

FIG. 9 depicts an embodiment 900 including message ordering of message frames 910 and probabilities of arrival 950 of the IVN in a traffic window as well as the effect and disposition of a sporadic message 952. Sporadic messages can be used to disrupt periodic traffic and MTS IDSs based on periodic traffic can be misled by sporadic messages such as the sporadic message 952. The sporadic message 952 arrives in the middle of the message group 914 and disrupts the sequence of probabilities of arrival 916 of a probability model such as the probability model 484 in FIG. 4. Many embodiments implement a probability model such as the probability model 484 in FIG. 4 to detect the sporadic message and, rather than modifying IDSs to adapt detection to account for the sporadic message 952, include shift logic circuitry 486 to shift the probability of arrival of the message that would have arrived if not for the sporadic message to a next message arrival.

The messages transmitted on the in-vehicle network bus are queued so the arrival of a sporadic message at a message slot at which the probability model expects a different message may indicate that the sporadic message had a higher priority and, as a result blocked the transmission of the expected message so the expected message may transmit in the next available transmission slot. Thus, the probability of arrival can be postponed to the next message arrival 954. If the expected message does not arrive at the next message arrival, then the detection logic circuitry may determine that the sporadic message represented an attack.

Figure 10A:
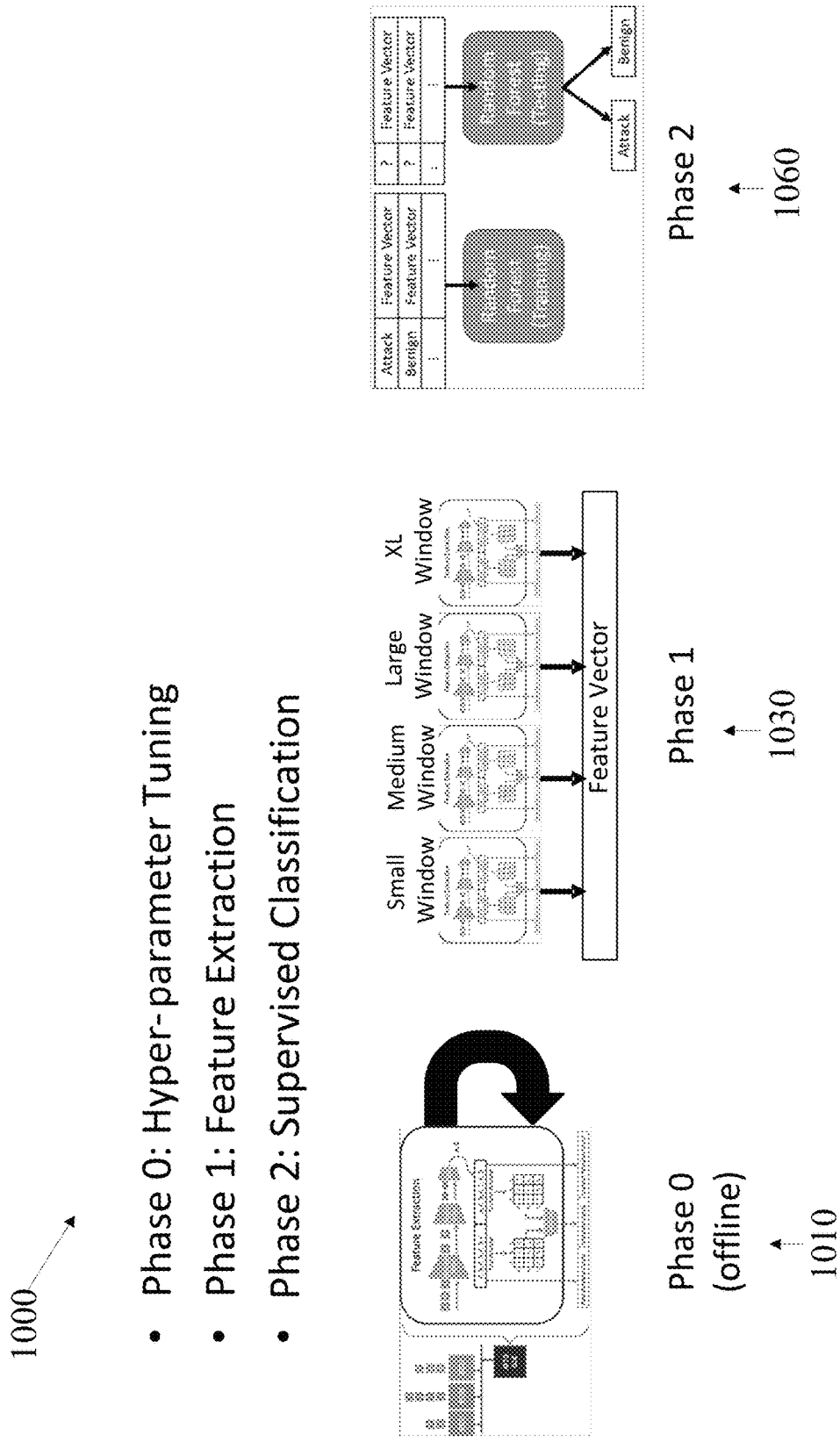
FIGS. 10A-D depict embodiments of hyperparameter tuning, multiple sized observation windows, feature extraction, and supervised training and testing of a random forest model.

FIGS. 10A-E depict embodiments 1000 of hyper-parameter tuning 1010, multiple sized observation windows and feature extraction 1030, and supervised training and testing of a detection model. FIG. 10A depict an embodiment 1000 of an overview of the process of creating some embodiment that involves for the selection of hyperparameters in phase 0, the feature extraction into a feature vector at phase 1 and the training and testing of a random forest model.

While the vehicle, such as the vehicle 100 shown in FIG. 1, is offline, hyper-parameter tuning may identify best performance under a set of training attacks. As an example of a simple approach: sweep across several configurations, bounded by reason (e.g. 1-4 second windows rather than 10 s of seconds). After identifying best performing parameters, train the classifier (detection model, which is the random forest model in this embodiment).

While the vehicle, such as the vehicle 100 shown in FIG. 1, is online, i.e., when the vehicle is moving, observe the IVN, extract features into feature vectors, and send the feature vectors to the classifier.

Figure 10B:
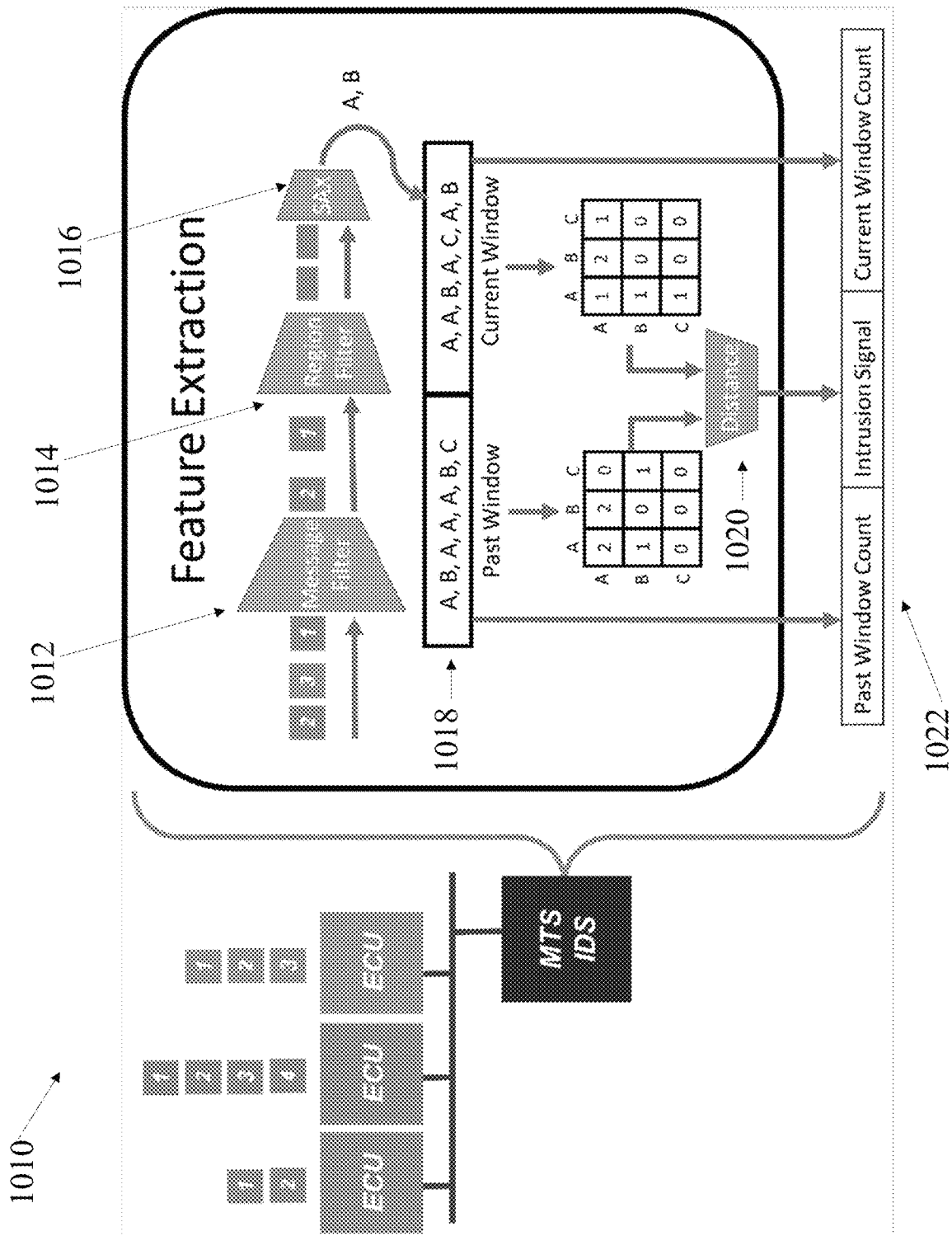

FIG. 10B depict an embodiment of hyper-parameter tuning 1010. The messages from the IVN are filtered by a message filter 1012 to identify messages of interest. The IVN bus frames of interest may be, e.g., messages that are critical for closed-loop systems, brake systems, etc. in a format such as the format of the CAN bus frame 300 shown in FIG. 3. If the goal is to protect ALL messages, the IDS could be logically grouped together (e.g. all ECU messages that are related to cruise control).

The messages are filtered by a region filter 1014 to identify portions of the messages that are of interest. There may be two alternate approaches here. First, let the hyper-parameter tuning identify regions. Alternatively, select bit segments in messages, or metadata of messages, that contain meaningful signals based on expert knowledge (e.g. use a Database Container (DBC) file to find signals such as wheel speed, sensor values, etc.). The DBC file describes the different message types, frame configurations, signals, identifiers, and the value ranges of the message fields, besides producer, consumer relationship, nodes of the bus, etc.

After filtering for portions of the IVN bus frames of interest (portions of messages), perform, e.g., symbolic aggregate approximation (SAX) 1016 to convert a time series signal into a string of characters to, advantageously, facilitate anomaly detection.

The past (historical) and current observation window sizes 1018 of the string of characters may be large enough to sample messages from ECUs that are under protection but not too large. "Large" here could mean several seconds. Many embodiments use window sizes of less than 5 seconds.

The past and current observation windows are converted to a bitmap for each window and a distance is calculated 1020. Some embodiments may use the Euclidean distance, but other metrics are viable for many embodiments. At the end of the hyper-parameter tuning 1010, three features are extracted 1022, which are then used in the machine learning classifier such as the random forest classifier (detection model) shown in FIG. 10D.

Figure 10C:
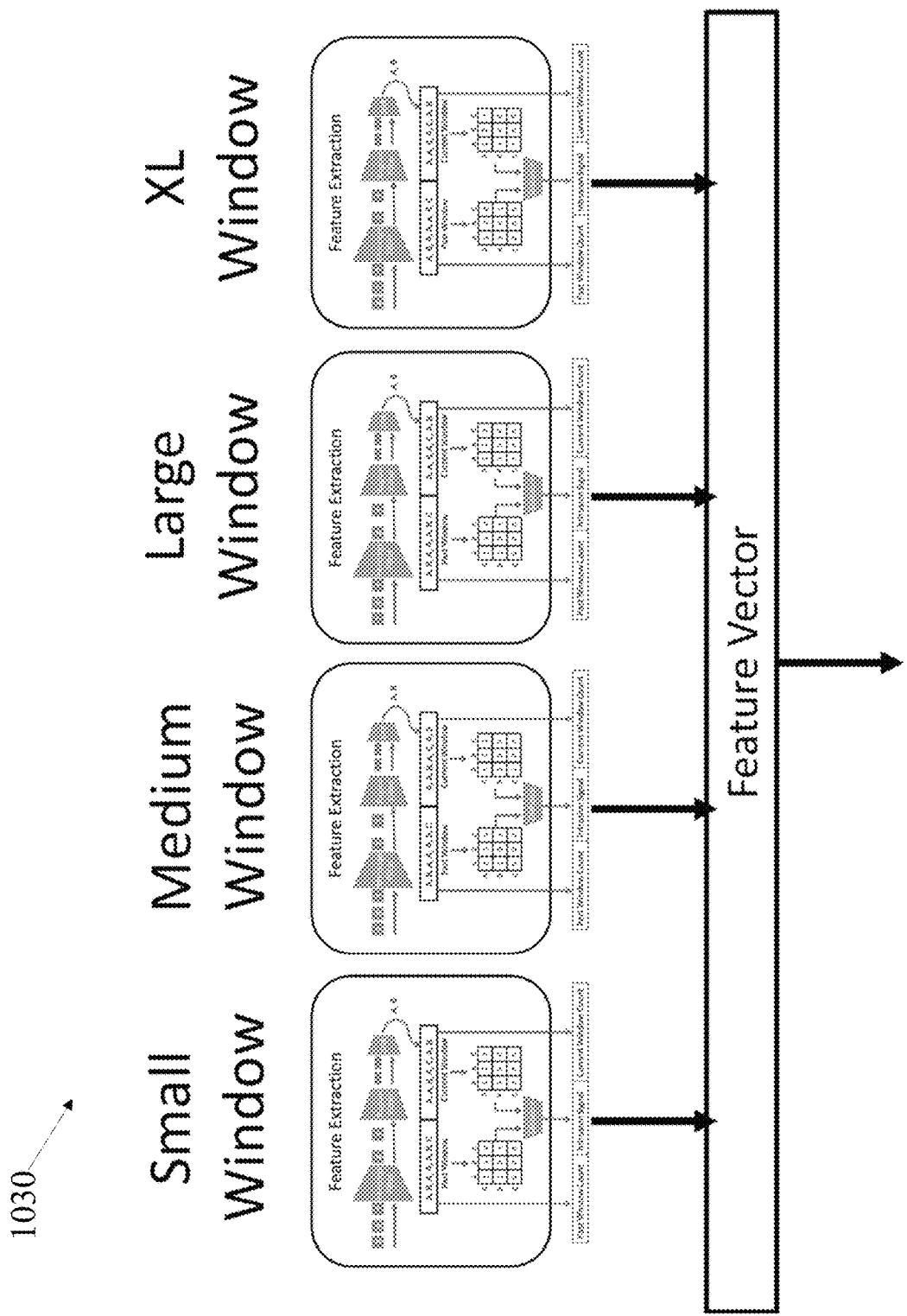

FIG. 10C depicts an embodiment of multiple-sized observation windows with feature extraction. The observation windows may use the best parameters from Phase 0. The same parameters for each instance are used except the window size. In the present embodiment, multiple window sizes are implemented for the current observation window. The diverse window size facilitates classification of a variety of masquerade injection attacks by the detection model in Phase 2.

A feature vector is created based on the multiple-sized observation windows and passed to the detection model for supervised training and testing. For training, the feature vector may include expected detection signal, a current observation window message count and a past (historical) window message count.

Figure 10D:
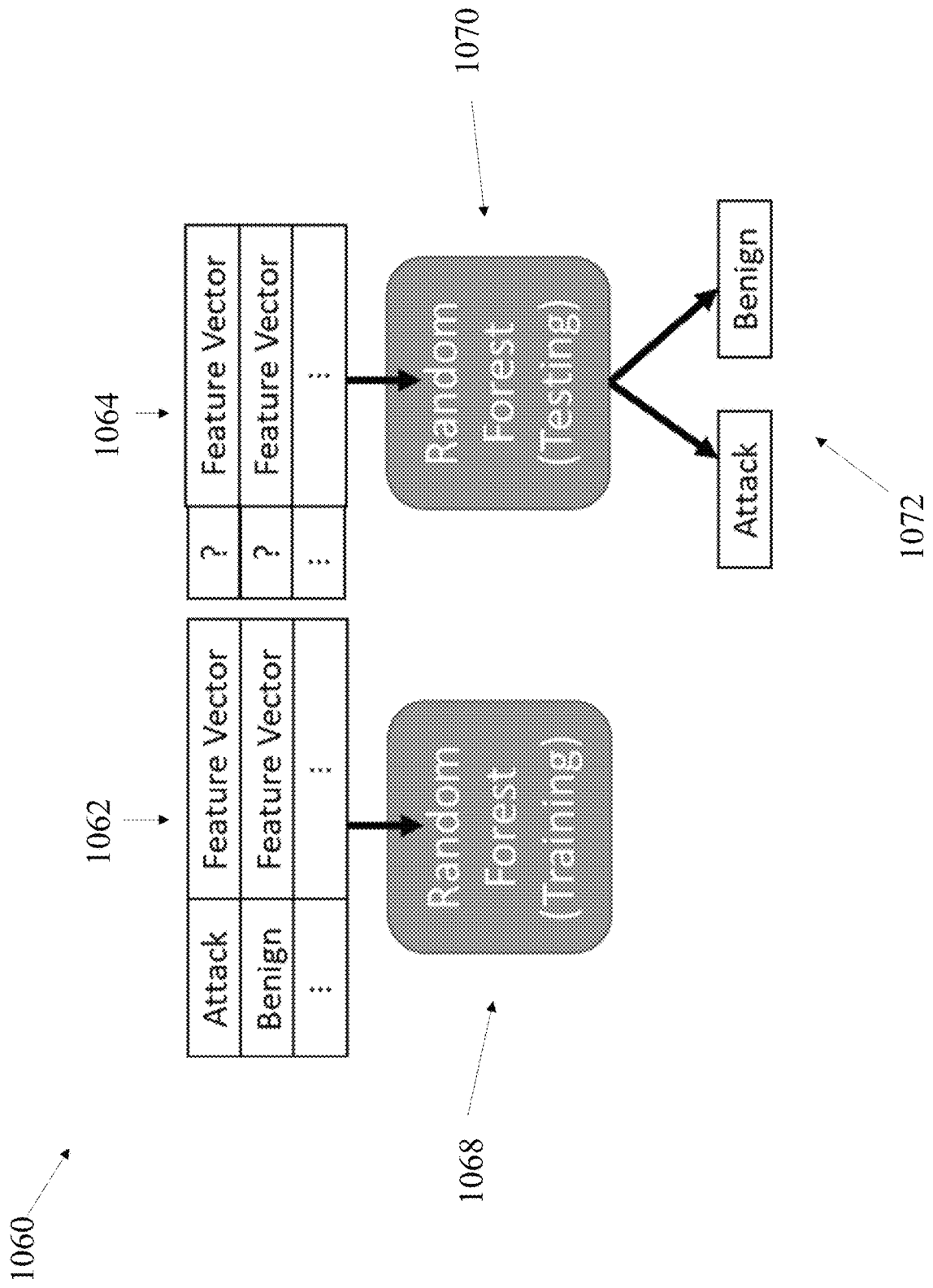

FIG. 10D depicts an embodiment 1060 of training and testing of a machine learning detection model. In particular, this embodiment illustrates training 1068 and testing 1070 of an ensemble classifier that is a random forest model. The training set 1062 may include attack traffic and benign traffic that is labeled with the expected detection signal of attack or benign. The attack traffic may include injection or suspension rates over a range at fixed interval lengths. Testing 1070 by, e.g., the random forest model, may output indications of classifications based on the input feature vectors. The indications of classifications may include indications as to whether traffic represented by a feature vector represents an attack or is benign 1072.

The testing set 1064 may include attack traffic and benign traffic that are not labeled with the expected detection signal of attack or benign. The attack traffic for testing may include a randomly selected injection or suspension rate and may not include overlapping attacks with training set. The benign traffic for testing may be collected independently from training set. Furthermore, all the traces may be collected while vehicle is in motion.

Note that the non-overlapping attackers for training/testing means that the attacker traces are different for training and testing. The type of attack may remain the same (masquerade for example) but the injection rate may be different. Note also that the training and testing sets are performed during live movement of the vehicle so each run is slightly different since the exact driving conditions could not be replicated each time.

FIGS. 10A-D show embodiments for which one or more experiments have been performed. The results were evaluated based on masquerade injection attacks and suspension attacks and below is a discussion of those results.

The detection logic circuitry performs well across different attacks. In one example, the classification time is less than 1 millisecond (ms). In other cases, depending on the hardware and other implementation details, classification time is in the nanosecond range. Time can vary widely and can vary significantly based on the implementation. Flooding attacks cause message buffers to fill and a delay is observed if messages are not dropped. The detection latency is dependent on the injection rate of the attacker. Likewise, for suspension, the detection latency is dependent on how often the sensor updates. Furthermore, the random forest classification time is less than 1 ms and the latency may be attributed to feature extraction and window size.

In sum, the results may indicate that MTS IDS can be well-suited for protecting a single ECU with well-defined traffic and messages. It is challenging to detect an attack if the defense surface is large simply because the attacker's signal becomes less apparent as the amount of traffic under consideration increases.

Figures 11A, 11B:
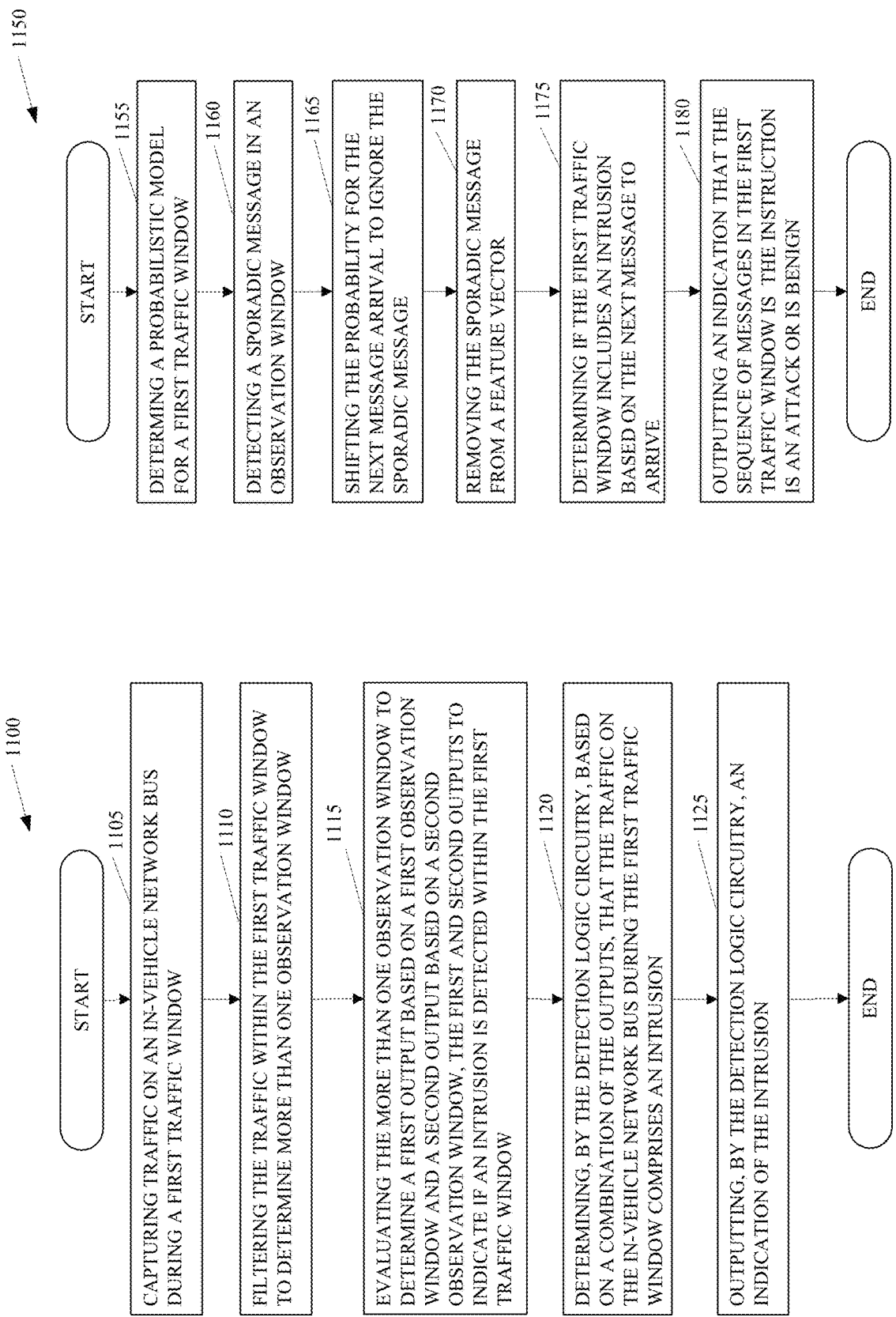
FIGS. 11A-B depict embodiments of flowcharts to detect intrusions via detection logic circuitry.

FIGS. 11A-B depict embodiments of flowcharts to detect intrusions via detection logic circuitry such as the detection logic circuitry 480 in FIG. 4 and handle sporadic messages with predictive modelling vis a probabilistic model such as the probabilistic model 484 shown in FIG. 4. In FIG. 11A the flowchart 1100 begins with detection logic circuitry capturing traffic on an in-vehicle network bus during a first traffic window (element 1105). The in-vehicle network bus may couple with several ECUs to accomplish various vehicle functions ranging from safety functions related to the operation of the vehicle to convenience functions related to an infotainment system. Communications between the various components such as sensors, actuators, and ECUs may transmit across the in-vehicle network bus making each of the components vulnerable to attacks such as flooding attacks, suspension attacks, and masquerading attacks. Thus, security operations typically being with monitoring traffic on the in-vehicle network bus via one or more IDSs.

After capturing traffic on an in-vehicle network bus, the detection logic circuitry may filter the traffic within the first traffic window to determine more than one observation window (element 1110). The detection logic circuitry may filter the traffic to generate multiple observation windows that look at the bus traffic from multiple vantage points. The evaluation of the bus traffic via multiple, filtered observation windows can, advantageously, reduce false negatives by adjusting detection thresholds or by processing feature vectors from each of the different observation windows via a machine learning detection model or a probabilistic model.

The detection logic circuitry may evaluate the more than one observation window to determine a first output based on a first observation window and a second output based on a second observation window, the first and second outputs to indicate if an intrusion is detected within the first traffic window (element 1115). For instance, embodiments may compare bit patterns in the first observation window with bit patterns of a historical window of traffic to determine a deviation and compare the deviation to a detection threshold to determine if the deviation represents an attack or intrusion. Further embodiments may process the bit patterns of the traffic in the observation windows through a detection model such as an ensemble classifier to compare the current observation windows against training involving historical windows of one or more different sizes to determine if the training indicates that the bit patterns in the current window indicate that the current observation window includes an attack. In still further embodiments, the detection logic circuitry may combine these operations with a probabilistic operation or alternatively perform a probabilistic review of the bit patterns from the observation windows to determine if the bit patterns deviate from the bit patterns for the probable timing and/or sequences of message arrivals in the observation windows.

Once the observation windows are evaluated, the detection logic circuitry may determine based on a combination of the outputs, that the traffic on the in-vehicle network bus during the first traffic window comprises an intrusion (element 1120). In other words, the detection logic circuitry may combine outputs from the comparison of the deviations to a detection threshold, combine outputs from the detection model classifier, and/or combine the outputs from the probabilistic model to determine whether, as a whole, the traffic represented in the observation windows represent an attack or benign traffic.

After determining that the combination of the observations represents an intrusion, the detection logic circuitry may output a message indicating that the intrusion/attack (element 1125). In some embodiments, the message indicating the attack is communicated on the in-vehicle bus.

FIG. 11B shows the flowchart 1150 that begins with determining a probabilistic model for a first traffic window (element 1155). Determining a probabilistic model may involve determining a single observation window in some embodiments, and multiple observation windows for a traffic window in other embodiments. The probabilistic model may receive sequences of messages with the observation windows and develop probable arrival sequences and/or timing within the observation windows to predict the timing of arrival of each expected message within an observation window.

After determining the probable arrivals of the messages, the probabilistic model may detect a sporadic message in an observation window (element 1160). The sporadic message, if benign, may be a high priority message that can surpass a message waiting in a message queue for transmission via arbitration logic circuitry, modifying the message ordering or sequence during an observation window. Rather than identifying the sporadic message as an intrusion or suspicious activity, the probabilistic model may shift the probability of the expected message arrival to the next time of arrival (element 1165).

In some embodiments, upon encountering the sporadic message, the probabilistic model may remove the sporadic message from a feature vector or observation window for another detection model (element 1170). The probabilistic model may remove the sporadic message to filter the feature vector or observation window to exclude the sporadic message and allow detection of intrusion without the added noise from inclusion of sporadic messages in the feature vector or observation window.

In some embodiments, upon encountering the sporadic message, the probabilistic model may determine if the first traffic window includes an intrusion based on the next message to arrive (element 1175). In further embodiments, the probabilistic model may also verify the sporadic message by monitoring for subsequent, related sporadic messages that are typically triggered by the initial sporadic message.

Upon evaluating the sporadic message and possibly subsequent sporadic messages, the probabilistic model may output an indication that the sequence of messages in the first traffic window is the instruction is an attack or is benign (element 1180).

FIG. 12 illustrates an example of a storage medium 1200 to store processor data structures. Storage medium 1200 may comprise an article of manufacture. In some examples, storage medium 1200 may include any non-transitory computer readable medium or machine-readable medium, such as an optical, magnetic or semiconductor storage. Storage medium 1200 may store various types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

FIG. 13 illustrates an example computing platform 1300. In some examples, as shown in FIG. 13, computing platform 1300 may include a processing component 1310, other platform components or a communications interface 1330. According to some examples, computing platform 1300 may be implemented in a computing device such as a server in a system such as a data center or server farm that supports a manager or controller for managing configurable computing resources as mentioned above. Furthermore, the communications interface 1330 may comprise a wake-up radio (WUR) and may be capable of waking up a main radio of the computing platform 1300.

According to some examples, processing component 1310 may execute processing operations or logic for apparatus 1315 described herein. Processing component 1310 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 1320, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1325 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1330 may include logic and/or features to support a communication interface. For these examples, communications interface 1330 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 1300 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 1300 described herein, may be included or omitted in various embodiments of computing platform 1300, as suitably desired.

The components and features of computing platform 1300 may be implemented using any combination of discrete circuitry, ASICs, logic gates and/or single chip architectures. Further, the features of computing platform 1300 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code to execute on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and may include processing circuitry to process the signals to generate the at least one output. While executing code, the code changes the physical states and characteristics of transistors that make up a processor pipeline and/or registers. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

Several embodiments have one or more potentially advantages effects. For instance, implementing a multiple observation windows enables detection of a relatively broad range of attacks as well as enables detection without use of a single static detection threshold. Filtering traffic windows to select specific types of messages advantageously enables detection of attacks with improved confidence and potentially lower latency by reducing the noise level associated with each observation window. Removing or ignoring sporadic messages advantageously facilitates detection systems to reduce false positives and reduces the noise levels associated with observation windows.

EXAMPLES OF FURTHER EMBODIMENTS

The following examples pertain to further embodiments. Specifics in the examples may be used anywhere in one or more embodiments.

Example 1 is an apparatus to detect intrusion in a sequence of messages, the apparatus comprising: memory; and a detection logic circuitry to: capture traffic on an in-vehicle network bus during a first traffic window; filter the traffic within the first traffic window to determine more than one observation window, wherein the more than observation window comprises at least a first observation window and a second observation window, wherein the first observation window is different from the second observation window based on differences in filtering of the traffic between the first observation window and the second observation window; evaluate the more than one observation window to determine a first output based on a first observation window and a second output based on a second observation window, the first and second outputs to indicate if an intrusion is detected within the first traffic window; determine, based on a combination of the outputs, that the traffic on the in-vehicle network bus during the first traffic window comprises an intrusion; and output an indication of the intrusion. In Example 2, the apparatus of Example 1, the detection logic circuitry to evaluate based on a first deviation threshold and based on determination of a first deviation between the traffic in the first observation window and the traffic during a second traffic window, the second traffic window preceding the first traffic window. In Example 3, the apparatus of Example 2, the detection logic circuitry to evaluate based on a second deviation threshold and based on determination of a second deviation between the traffic in the second observation window and the traffic during the second traffic window. In Example 4, the apparatus of Example 3, wherein the first deviation threshold is independent of the second deviation threshold. In Example 5, the apparatus of Example 3, wherein the first deviation threshold and the second deviation threshold are dynamic. In Example 6, the apparatus of Example 1, the detection logic circuitry to filter the traffic to create the first observation window with one or more types of messages, one or more portions of messages, or a combination thereof. In Example 7, the apparatus of Example 6, wherein the first observation window comprises specific types of traffic to reduce a noise level associated with the first observation window. In Example 8, the apparatus of Example 1, wherein evaluation to determine the first output comprises comparison of the first observation window against a first historic window, the first historic window filtered in accordance with filtering for the first observation window. In Example 9, the apparatus of Example 8, wherein evaluation to determine the second output comprises comparison of the second observation window against a second historic window, the second historic window filtered in accordance with filtering for the second observation window. In Example 10, the apparatus of Example 9, the first historic window comprising a different duration of the traffic than the duration of the traffic in the second historic window, wherein the durations of the first historic window and the second historic window overlap. In Example 11, the apparatus of Example 1, the detection logic circuitry to comprise predictive modelling to remove sporadic messages from the first observation window and the second observation window. In Example 12, the apparatus of Example 1, the detection logic circuitry to comprise predictive modelling to ignore a sporadic message for detection of the intrusion.

Example 13 is a method to detect intrusion in a sequence of messages, the method comprising: capturing, by a detection logic circuitry, traffic on an in-vehicle network bus during a first traffic window; filtering, by the detection logic circuitry, the traffic within the first traffic window to determine more than one observation window, wherein the more than observation window comprises at least a first observation window and a second observation window, wherein the first observation window is different from the second observation window based on differences in filtering of the traffic between the first observation window and the second observation window; evaluating, by the detection logic circuitry, the more than one observation window to determine a first output based on a first observation window and a second output based on a second observation window, the first and second outputs to indicate if an intrusion is detected within the first traffic window; determining, by the detection logic circuitry, based on a combination of the outputs, that the traffic on the in-vehicle network bus during the first traffic window comprises an intrusion; and outputting, by the detection logic circuitry, an indication of the intrusion. In Example 14, the method of Example 13, further comprising evaluating based on a first deviation threshold and based on determination of a first deviation between the traffic in the first observation window and the traffic during a second traffic window, the second traffic window preceding the first traffic window. In Example 15, the method of Example 14, further comprising evaluating based on a second deviation threshold and based on determination of a second deviation between the traffic in the second observation window and the traffic during the second traffic window. In Example 16, the method of Example 15, wherein the first deviation threshold is independent of the second deviation threshold. In Example 17, the method of Example 15, wherein the first deviation threshold and the second deviation threshold are dynamic. In Example 18, the method of Example 13, further comprising filtering the traffic to create the first observation window with one or more types of messages, one or more portions of messages, or a combination thereof. In Example 19, the method of Example 18, wherein the first observation window comprises specific types of traffic to reduce a noise level associated with the first observation window. In Example 20, the method of Example 13, wherein evaluation to determine the first output comprises comparison of the first observation window against a first historic window, the first historic window filtered in accordance with filtering for the first observation window. In Example 21, the method of Example 20, wherein evaluation to determine the second output comprises comparison of the second observation window against a second historic window, the second historic window filtered in accordance with filtering for the second observation window. In Example 22, the method of Example 21, the first historic window comprising a different duration of the traffic than the duration of the traffic in the second historic window, wherein the durations of the first historic window and the second historic window overlap. In Example 23, the method of Example 13, further comprising removing sporadic messages from the first observation window and the second observation window. In Example 24, the method of Example 13, further comprising ignoring a sporadic message for detection of the intrusion.

Example 25 is a computer program product comprising a non-transitory computer-readable medium, comprising instructions, which when executed by a processor cause the processor to perform operations, the operations to: capture traffic on an in-vehicle network bus during a first traffic window; filter the traffic within the first traffic window to determine more than one observation window, wherein the more than observation window comprises at least a first observation window and a second observation window, wherein the first observation window is different from the second observation window based on differences in filtering of the traffic between the first observation window and the second observation window; evaluate the more than one observation window to determine a first output based on a first observation window and a second output based on a second observation window, the first and second outputs to indicate if an intrusion is detected within the first traffic window; determine, based on a combination of the outputs, that the traffic on the in-vehicle network bus during the first traffic window comprises an intrusion; and output an indication of the intrusion. In Example 26, the computer program product of Example 25, wherein the operations further comprise operations to evaluate based on a first deviation threshold and based on determination of a first deviation between the traffic in the first observation window and the traffic during a second traffic window, the second traffic window preceding the first traffic window. In Example 27, the computer program product of Example 26, wherein the operations further comprise operations to evaluate based on a second deviation threshold and based on determination of a second deviation between the traffic in the second observation window and the traffic during the second traffic window. In Example 28, the computer program product of Example 27, wherein the first deviation threshold is independent of the second deviation threshold. In Example 29, the computer program product of Example 27, wherein the first deviation threshold and the second deviation threshold are dynamic. In Example 30, the computer program product of Example 25, wherein the operations further comprise operations to filter the traffic to create the first observation window with one or more types of messages, one or more portions of messages, or a combination thereof. In Example 31, the computer program product of Example 30, wherein the first observation window comprises specific types of traffic to reduce a noise level associated with the first observation window. In Example 32, the computer program product of Example 25, wherein the second traffic window is a larger window of time than the first traffic window. In Example 33, the computer program product of Example 32, wherein the operations further comprise operations to filter the traffic within a third window of the traffic, the third window to overlap with the first traffic window to determine more than one observation window of the traffic on the in-vehicle network bus during the third window and to evaluate the more than one observation window of the traffic on the in-vehicle network bus during the third window to determine one or more outputs. In Example 34, the computer program product of Example 33, wherein the operations further comprise operations to combine outputs based on the first traffic window and the third window to detect the intrusion. In Example 35, the computer program product of Example 25, wherein the operations further comprise operations to comprise predictive modelling to remove sporadic messages from the first observation window and the second observation window. In Example 36, the computer program product of Example 25, wherein the operations further comprise operations to ignore a sporadic message for detection of the intrusion.

Example 36 is an system to detect intrusion in a sequence of messages, the system comprising: memory comprising flash memory and random access memory; and a detection logic circuitry to: capture traffic on an in-vehicle network bus during a first traffic window; filter the traffic within the first traffic window to determine more than one observation window, wherein the more than observation window comprises at least a first observation window and a second observation window, wherein the first observation window is different from the second observation window based on differences in filtering of the traffic between the first observation window and the second observation window; evaluate the more than one observation window to determine a first output based on a first observation window and a second output based on a second observation window, the first and second outputs to indicate if an intrusion is detected within the first traffic window; determine, based on a combination of the outputs, that the traffic on the in-vehicle network bus during the first traffic window comprises an intrusion; and output an indication of the intrusion. In Example 37, the system of Example 36, the detection logic circuitry to evaluate based on a first deviation threshold and based on determination of a first deviation between the traffic in the first observation window and the traffic during a second traffic window, the second traffic window preceding the first traffic window. In Example 38, the system of Example 37, the detection logic circuitry to evaluate based on a second deviation threshold and based on determination of a second deviation between the traffic in the second observation window and the traffic during the second traffic window. In Example 39, the system of Example 38, wherein the first deviation threshold is independent of the second deviation threshold. In Example 40, the system of Example 38, wherein the first deviation threshold and the second deviation threshold are dynamic. In Example 41, the system of Example 36, the detection logic circuitry to filter the traffic to create the first observation window with one or more types of messages, one or more portions of messages, or a combination thereof. In Example 42, the system of Example 41, wherein the first observation window comprises specific types of traffic to reduce a noise level associated with the first observation window. In Example 43, the system of Example 36, wherein evaluation to determine the first output comprises comparison of the first observation window against a first historic window, the first historic window filtered in accordance with filtering for the first observation window. In Example 44, the system of Example 43, wherein evaluation to determine the second output comprises comparison of the second observation window against a second historic window, the second historic window filtered in accordance with filtering for the second observation window. In Example 45, the system of Example 44, the first historic window comprising a different duration of the traffic than the duration of the traffic in the second historic window, wherein the durations of the first historic window and the second historic window overlap. In Example 46, the system of Example 36, the detection logic circuitry to comprise predictive modelling to remove sporadic messages from the first observation window and the second observation window. In Example 47, the system of Example 36, the detection logic circuitry to comprise predictive modelling to ignore a sporadic message for detection of the intrusion.

Example 48 is an apparatus to detect intrusion in a sequence of messages, the apparatus comprising: a means for capturing traffic on an in-vehicle network bus during a first traffic window; a means for filtering, by the detection logic circuitry, the traffic within the first traffic window to determine more than one observation window, wherein the more than one observation window comprises at least a first observation window and a second observation window, wherein the first observation window is different from the second observation window based on differences in filtering of the traffic between the first observation window and the second observation window; a means for evaluating the more than one observation window to determine a first output based on a first observation window and a second output based on a second observation window, the first and second outputs to indicate if an intrusion is detected within the first traffic window; a means for determining based on a combination of the outputs, that the traffic on the in-vehicle network bus during the first traffic window comprises an intrusion; and a means for outputting an indication of the intrusion. In Example 49, the apparatus of Example 48, further comprising a means for evaluating based on a first deviation threshold and based on determination of a first deviation between the traffic in the first observation window and the traffic during a second traffic window, the second traffic window preceding the first traffic window. In Example 50, the apparatus of Example 49, further comprising a means for evaluating based on a second deviation threshold and based on determination of a second deviation between the traffic in the second observation window and the traffic during the second traffic window. In Example 51, the apparatus of Example 50, wherein the first deviation threshold is independent of the second deviation threshold. In Example 52, the apparatus of Example 50, wherein the first deviation threshold and the second deviation threshold are dynamic. In Example 53, the apparatus of Example 48, further comprising a means for filtering the traffic to create the first observation window with one or more types of messages, one or more portions of messages, or a combination thereof. In Example 54, the apparatus of Example 53, wherein the first observation window comprises specific types of traffic to reduce a noise level associated with the first observation window. In Example 55, the apparatus of Example 48, wherein evaluation to determine the first output comprises comparison of the first observation window against a first historic window, the first historic window filtered in accordance with filtering for the first observation window. In Example 56, the apparatus of Example 55, wherein evaluation to determine the second output comprises comparison of the second observation window against a second historic window, the second historic window filtered in accordance with filtering for the second observation window. In Example 57, the apparatus of Example 56, the first historic window comprising a different duration of the traffic than the duration of the traffic in the second historic window, wherein the durations of the first historic window and the second historic window overlap. In Example 58, the apparatus of Example 48, further comprising a means for removing sporadic messages from the first observation window and the second observation window. In Example 59, the apparatus of Example 48, further comprising a means for ignoring a sporadic message for detection of the intrusion.

What is claimed is:

1. An apparatus to detect an intrusion in a sequence of messages, the apparatus comprising:
   memory; and
   a detection logic circuitry to:
      capture traffic on an in-vehicle network bus during a first traffic window, the traffic including message content, message metadata and bit patterns of an in-vehicle network;
      filter the traffic within the first traffic window to determine more than one observation window, wherein the more than one observation window comprises at least a first observation window and a second observation window, wherein the first observation window is different from the second observation window based on differences in filtering of the traffic between the first observation window and the second observation window;
      extracting a feature vector comprising a set of features extracted from the message content, message metadata and bit patterns from each of the more than one observation windows;
      classify the traffic for each observation window, using a machine learning classifier taking the feature vector as input, as including an intrusion or not including an intrusion; and
      output an indication of the intrusion when the machine learning classifier classifies the traffic as including the intrusion.

2. The apparatus of claim 1, the detection logic circuitry to evaluate based on a first deviation threshold and based on determination of a first deviation between the traffic in the first observation window and the traffic during a second traffic window, the second traffic window preceding the first traffic window.

3. The apparatus of claim 2, the detection logic circuitry to evaluate based on a second deviation threshold and based on determination of a second deviation between the traffic in the second observation window and the traffic during the second traffic window.

4. The apparatus of claim 3, wherein the first deviation threshold is independent of the second deviation threshold.

5. The apparatus of claim 3, wherein the first deviation threshold and the second deviation threshold are dynamic.

6. The apparatus of claim 1, the detection logic circuitry to filter the traffic to create the first observation window with one or more types of messages, one or more portions of messages, or a combination thereof.

7. The apparatus of claim 6, wherein the first observation window comprises specific types of traffic to reduce a noise level associated with the first observation window.

8. The apparatus of claim 1, wherein classification of the feature vector for the first observation window comprises comparison of the first observation window against a first historic window, the first historic window filtered in accordance with filtering for the first observation window.

9. The apparatus of claim 8, wherein classification of the feature vector for the second observation window comprises comparison of the second observation window against a second historic window, the second historic window filtered in accordance with filtering for the second observation window.

10. The apparatus of claim 9, the first historic window comprising a different duration of the traffic than the duration of the traffic in the second historic window, wherein the durations of the first historic window and the second historic window overlap.

11. The apparatus of claim 1, the detection logic circuitry further comprising predictive modelling to remove sporadic messages from the first observation window and the second observation window.

12. The apparatus of claim 1, the detection logic circuitry further comprising predictive modelling to ignore a sporadic message for detection of the intrusion.

13. A method to detect an intrusion in a sequence of messages, the method comprising:
capturing, by a detection logic circuitry, traffic on an in-vehicle network bus during a first traffic window, the traffic including message content, message metadata and bit patterns of an in-vehicle network;
filtering, by the detection logic circuitry, the traffic within the first traffic window to determine more than one observation window, wherein the more than one observation window comprises at least a first observation window and a second observation window, wherein the first observation window is different from the second observation window based on differences in filtering of the traffic between the first observation window and the second observation window;
extracting, by the detection logic circuitry, a feature vector comprising a set of features extracted from the message content, message metadata and bit patterns from each of the more than one observation windows;
classify the traffic for each observation window, using a machine learning classifier taking the feature vector as input, as including an intrusion or not including an intrusion; and
outputting, by the detection logic circuitry, an indication of the intrusion when the machine learning classifier classifies the traffic as including the intrusion.

14. The method of claim 13, further comprising evaluating based on a first deviation threshold and based on determination of a first deviation between the traffic in the first observation window and the traffic during a second traffic window, the second traffic window preceding the first traffic window.

15. The method of claim 14, further comprising evaluating based on a second deviation threshold and based on determination of a second deviation between the traffic in the second observation window and the traffic during the second traffic window.

16. The method of claim 15, wherein the first deviation threshold is independent of the second deviation threshold.

17. The method of claim 15, wherein the first deviation threshold and the second deviation threshold are dynamic.

18. The method of claim 13, further comprising filtering the traffic to create the first observation window with one or more types of messages, one or more portions of messages, or a combination thereof.

19. A computer program product comprising a non-transitory computer-readable medium, comprising instructions, which when executed by a processor cause the processor to perform operations, the operations to:
capture traffic on an in-vehicle network bus during a first traffic window, the traffic including message content, message metadata and bit patterns of an in-vehicle network;
filter the traffic within the first traffic window to determine more than one observation window, wherein the more than one observation window comprises at least a first observation window and a second observation window, wherein the first observation window is different from the second observation window based on differences in filtering of the traffic between the first observation window and the second observation window;
extract a feature vector comprising a set of features extracted from the message content, message metadata and bit patterns from each of the more than one observation windows;
classifying the traffic for each observation window, using a machine learning classifier taking the feature vector as input, as including an intrusion or not including an intrusion; and
output an indication of the intrusion when the machine learning classifier classifies the traffic as including the intrusion.

20. The computer program product of claim 19, wherein the operations further comprise operations to filter the traffic to create the first observation window with one or more types of messages, one or more portions of messages, or a combination thereof.

21. The computer program product of claim 20, wherein the first observation window comprises specific types of traffic to reduce a noise level associated with the first observation window.

22. The computer program product of claim 19, wherein the second traffic window is a larger window of time than the first traffic window.

23. The computer program product of claim 22, wherein the operations further comprise operations to combine outputs based on the first traffic window and a third window to detect the intrusion.

24. The computer program product of claim 19, wherein the operations further comprise operations to comprise predictive modelling to remove sporadic messages from the first observation window and the second observation window.

25. The computer program product of claim 19, wherein the operations further comprise operations to ignore a sporadic message for detection of the intrusion.

* * * * *